US012711146B2

(12) United States Patent
Singh et al.

(10) Patent No.: US 12,711,146 B2
(45) **Date of Patent: *Aug. 18, 2026**

(54) TECHNIQUES FOR UPGRADING AND ACCESSING METADATA

(71) Applicant: Rubrik, Inc., Palo Alto, CA (US)

(72) Inventors: Janmejay Singh, Bangalore (IN); Atanu Mishra, Cupertino, CA (US); Lalit Gupta, Dublin, CA (US); Matthew Wu, Menlo Park, CA (US); Shubham Jadhav, Bangalore (IN)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/938,070

(22) Filed: Nov. 5, 2024

(65) Prior Publication Data

US 2025/0061130 A1 Feb. 20, 2025

Related U.S. Application Data

(63) Continuation of application No. 17/955,400, filed on Sep. 28, 2022, now Pat. No. 12,153,600.

(51) Int. Cl.
*G06F 16/25* (2019.01)
*G06F 16/23* (2019.01)

(52) U.S. Cl.
CPC ........ *G06F 16/258* (2019.01); *G06F 16/2358* (2019.01)

(58) Field of Classification Search
CPC ........................... G06F 16/258; G06F 16/2358
USPC .......................................................... 707/756
See application file for complete search history.

(56) References Cited

U.S. PATENT DOCUMENTS 6,460,043 B1 * 10/2002 Tabbara .............. G06F 16/2423
6,591,278 B1 7/2003 Ernst
8,214,404 B2 7/2012 Kazar
9,152,643 B2 10/2015 Whitehead et al.
10,838,781 B1 * 11/2020 Banerjee ............... G06F 16/907
2004/0210582 A1 * 10/2004 Chatterjee ............... G06F 16/27 707/999.009
2013/0191357 A1 * 7/2013 Hanis ..................... G06Q 10/06 707/E17.005
2014/0095445 A1 * 4/2014 Deshmukh ............ G06F 16/951 707/661
2014/0095525 A1 * 4/2014 Hsiao .................... G06F 16/242 707/759

(Continued)

*Primary Examiner* — Hicham Skhoun
(74) *Attorney, Agent, or Firm* — Holland & Hart LLP

(57) ABSTRACT

Methods, systems, and devices for data management are described. A data management system (DMS) may receive a request to access metadata stored in a distributed metadata repository. The request may have a first semantic format compatible with a first version of the distributed metadata repository. The DMS may translate the first semantic format of the request to a second semantic format compatible with a second version of the distributed metadata repository. The DMS may perform the semantic translation according to a label in the request. Accordingly, the DMS may determine whether a current version of the metadata corresponds to the first version of the distributed metadata repository or the second version of the distributed metadata repository, and may access the metadata in the distributed metadata repository based on the request and the current version of the metadata.

18 Claims, 14 Drawing Sheets

(56) References Cited

U.S. PATENT DOCUMENTS

| | | | | |
|---|---|---|---|---|
| 2017/0052879 | A1* | 2/2017 | Chandra | G06F 11/3668 |
| 2019/0171751 | A1 | 6/2019 | Laurent et al. | |
| 2022/0179876 | A1* | 6/2022 | Hrastnik | G06F 16/245 |
| 2022/0253783 | A1 | 8/2022 | Mookherjee | |
| 2023/0035166 | A1 | 2/2023 | Gottimukkala et al. | |
| 2023/0091845 | A1* | 3/2023 | Buchmann | G06F 16/258 707/769 |
| 2023/0251939 | A1 | 8/2023 | Brown et al. | |
| 2023/0281171 | A1* | 9/2023 | Bhowmick | G06F 16/258 707/722 |
| 2024/0004867 | A1 | 1/2024 | Pandis et al. | |

* cited by examiner

TECHNIQUES FOR UPGRADING AND ACCESSING METADATA

CROSS REFERENCE

The present Application for Patent is a continuation of U.S. patent application Ser. No. 17/955,400 by Singh et al., entitled "TECHNIQUES FOR UPGRADING AND ACCESSING METADATA," filed Sep. 28, 2022, assigned to the assignee hereof, and expressly incorporated by reference herein.

FIELD OF TECHNOLOGY

The present disclosure relates generally to data management, and more specifically to techniques for upgrading and accessing metadata.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

A DMS may use metadata for various purposes (backup, recovery, archival, file management). Upgrading or otherwise modifying attributes of this metadata may disrupt the applications and services that rely on this metadata, resulting in service outages, errors, data loss, etc.

DETAILED DESCRIPTION

Figure 1:
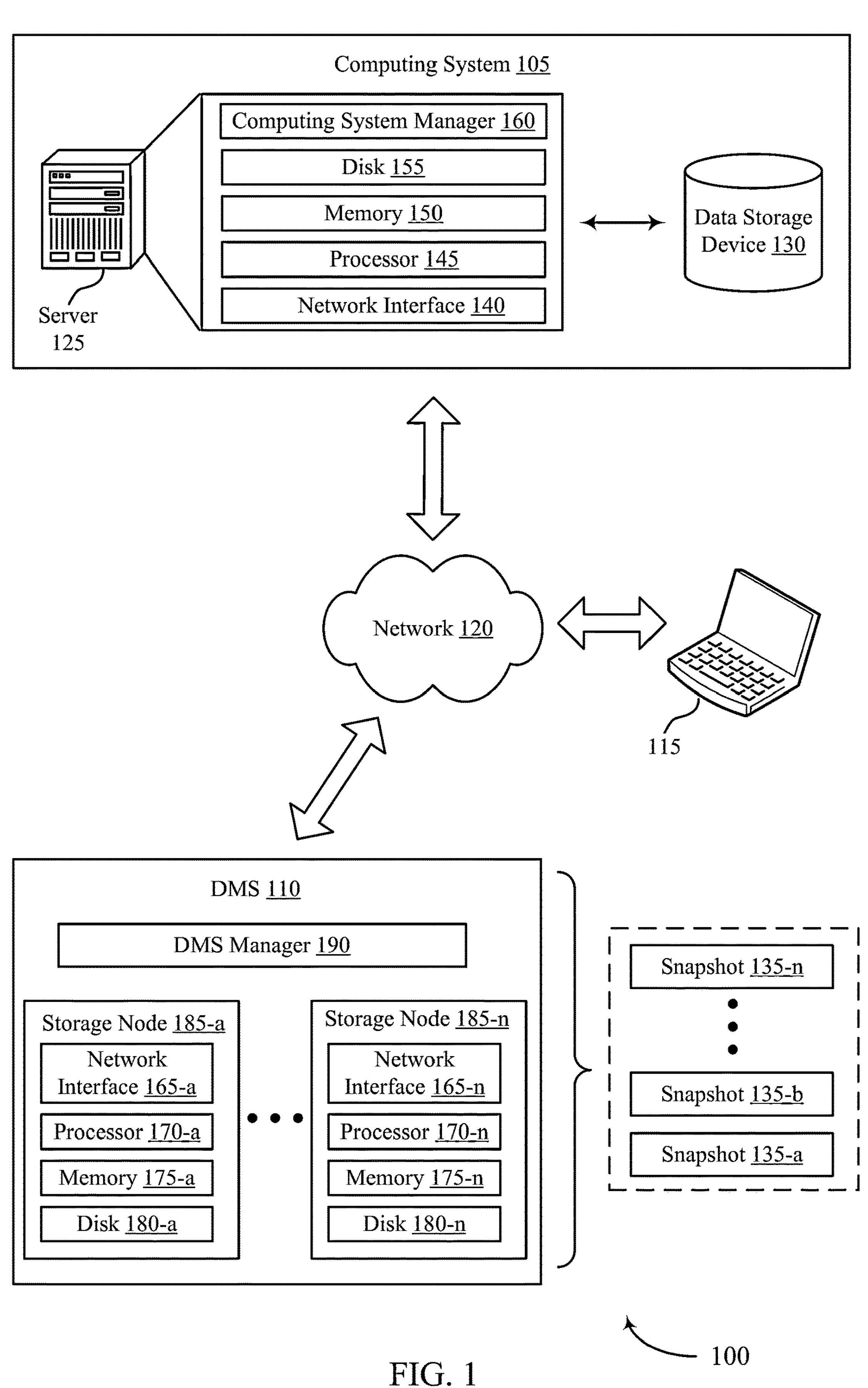
FIGS. 1 through 3 illustrate examples of computing environments that support techniques for upgrading and accessing metadata in accordance with aspects of the present disclosure.

In a data management system (DMS), multiple servers (physical or virtual) may operate as a single entity (also referred to herein as a cluster). Small blocks (segments, chunks) of client data may be stored across various servers or machines (equivalently referred to herein as nodes) in a cluster. The DMS may use metadata to properly aggregate these blocks into cohesive files. This metadata may be stored in a repository managed by a distributed metadata storage service. In some cases, if an administrator of the DMS updates the structure, syntax, or format of this metadata, the changes may impact other systems and services that rely on the metadata. To ensure that metadata upgrades are executed correctly, system administrators may block services from interacting with or utilizing the metadata while the metadata is upgraded, which may result in service disruptions, errors, data loss, etc.

To support rolling (disruption-free) metadata upgrades, different services may need to interact with different versions of the metadata. For example, if an application or service supported by the DMS requests metadata during a rolling upgrade (RU), different subsets of the requested metadata may have different structures, semantic formats, relationships, etc. In accordance with the techniques described herein, an intermediate protocol proxy that interfaces with the distributed metadata storage service may alter or otherwise reformat the requested metadata to ensure that the version (structure, syntax, format) of metadata expected by the application or service is compatible with the version of metadata returned to the application or service. The intermediate protocol proxy may also perform a semantic translation on the request to ensure that the request is correctly processed.

As an example, the intermediate protocol proxy (referred to herein as colproxy) may receive a request to access a subset of metadata (e.g., one or more rows, columns, or tables) stored in a distributed metadata repository of a DMS. The request may have a first semantic format that is compatible with a first version of the distributed metadata repository. A label handling (LH) component of the intermediate protocol proxy (referred to herein as LabelHandler) may translate the first semantic format of the request to a second semantic format that is compatible with a second (upgraded) version of the distributed metadata repository. The LH component may perform the semantic translation based on a label in the request. Accordingly, the intermediate protocol proxy may determine whether a current version of the requested metadata corresponds to the first version of the distributed metadata repository or the second version of the distributed metadata repository.

Once the intermediate protocol proxy has identified the current version of the requested metadata, a statement executing component of the intermediate protocol proxy may access the requested metadata (in the distributed metadata repository) based on the request and the current version of the requested metadata. If, for example, the current version of the requested metadata corresponds to the first (earlier) version of the distributed metadata repository, a row migrating (RM) component of the intermediate protocol proxy (referred to herein as RowMigrator) may apply one or more representational changes to the requested metadata before executing the request. Alternatively, if the current version of the requested metadata corresponds to the second version of the distributed metadata repository (e.g., if the requested metadata has been fully upgraded), the RM component may execute the request without applying representational changes (referred to herein as MetadataChanges) to the requested metadata.

Aspects of the present disclosure may be implemented to realize one or more of the following advantages. The techniques described herein may enable a DMS to implement metadata upgrades with fewer disruptions, greater efficiency, and higher failure tolerance, among other benefits. For example, rather than blocking applications and services from accessing metadata while the metadata is being upgraded, the DMS may use the techniques described herein to provide uninterrupted metadata access for all metadata upgrade states and operating versions. Specifically, the DMS may use an intermediate protocol proxy to ensure that the format and structure of metadata requested by an application or service aligns with the format and structure of metadata returned to the application or service. As such, the described techniques may enable the DMS to implement metadata upgrades without delays or compatibility issues.

Aspects of the disclosure are initially described in the context of computing environments and process flows. Aspects of the disclosure are further illustrated by and described with reference to apparatus diagrams, system diagrams, and flowcharts that relate to techniques for upgrading and accessing metadata.

FIG. 1 illustrates an example of a computing environment 100 that supports techniques for upgrading and accessing metadata in accordance with various aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory such as random access memory (RAM), static random access memory (SRAM), dynamic random access memory (DRAM), read-only memory (ROM), electrically erasable programmable read-only memory (EEPROM), Flash, etc. Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g. a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state-which may be referred to as the delta-of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely.

In accordance with aspects of the present disclosure, the DMS 110 may receive a request to access metadata stored in a distributed metadata repository of the DMS 110. The request may have a first semantic format compatible with a first version of the distributed metadata repository. The DMS 110 may translate the first semantic format of the request to a second semantic format compatible with a second version of the distributed metadata repository. The DMS 110 may perform the semantic translation according to a label in the request. Accordingly, the DMS 110 may determine whether a current version of the metadata corresponds to the first version of the distributed metadata repository or the second version of the distributed metadata repository, and may access the metadata in the distributed metadata repository based on the request and the current version of the metadata.

Aspects of the computing environment 100 may be implemented to realize one or more of the following advantages. The techniques described with reference to FIG. 1 may enable the DMS 110 to implement metadata upgrades with fewer disruptions, greater efficiency, and higher failure tolerance, among other benefits. For example, rather than blocking applications and services from accessing metadata while the metadata is being upgraded, the DMS 110 may use the techniques described herein to provide uninterrupted metadata access for all metadata upgrade states and operating versions. Specifically, the DMS 110 may use an intermediate protocol proxy to ensure that the format and structure of metadata requested by an application or service aligns with the format and structure of metadata returned to the application or service. As such, the described techniques may enable the DMS 110 to implement metadata upgrades without delays or compatibility issues.

Figure 2:
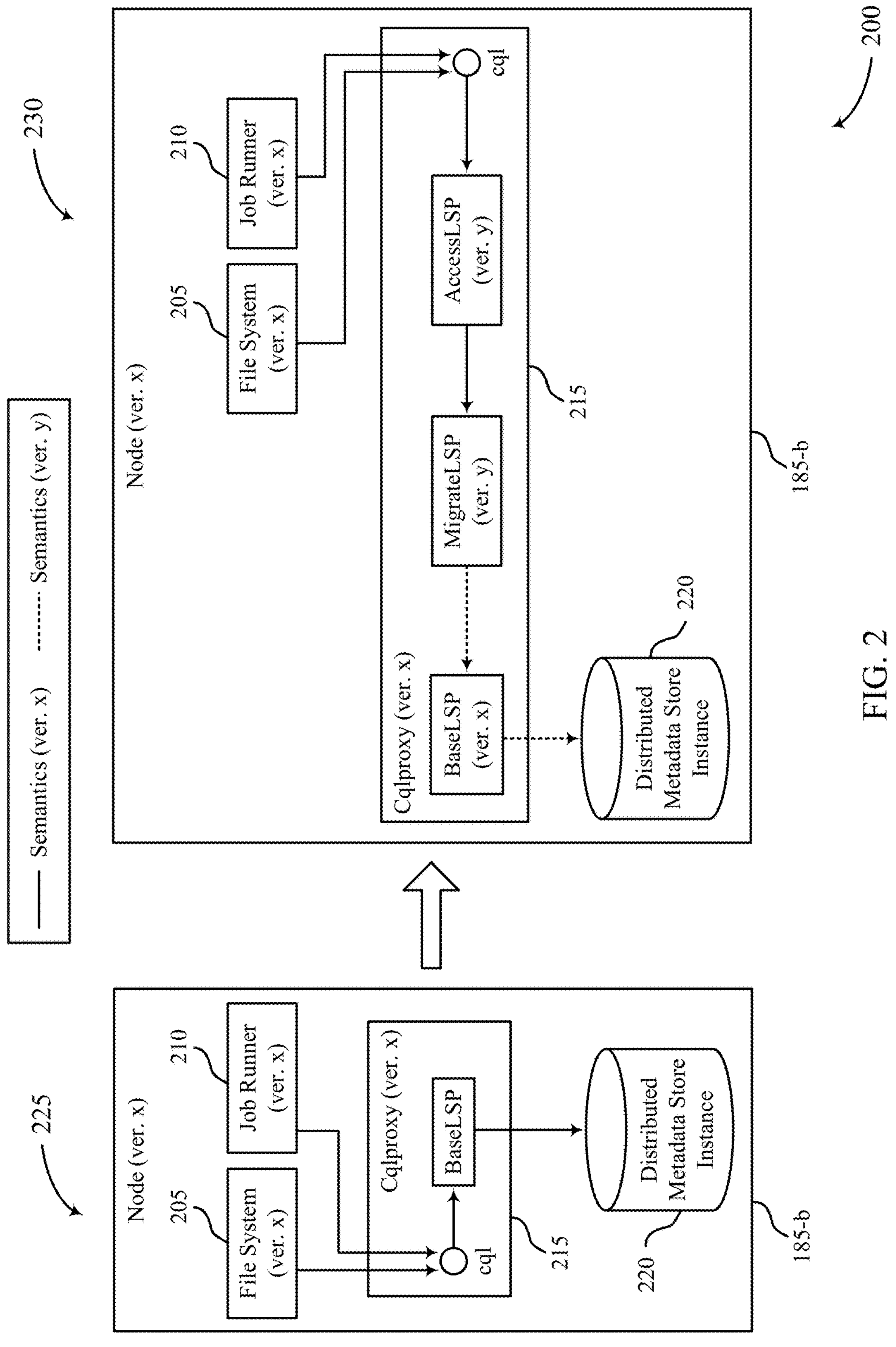

FIG. 2 illustrates an example of a computing environment 200 that supports techniques for upgrading and accessing metadata in accordance with aspects of the present disclosure. The computing environment 200 may implement or be implemented by aspects of the computing environment 100. For example, the computing environment 200 may include a storage node 185-*b*, which may be an example of the storage nodes 185 described with reference to FIG. 1. In the example of FIG. 2, one or both of a file system 205 or a job runner service 210 may request access to metadata stored in a distributed metadata store instance 220. These requests may be processed and executed by an intermediate protocol proxy 215 (referred to herein as cqlproxy) that interfaces with the file system 205, the job runner service 210, and the distributed metadata store instance 220.

The storage node 185-*b* illustrated in the example of FIG. 2 may be a part of a complex distributed system (equivalently referred to as a DMS) that runs as a cluster over multiple physical or virtual servers in a cloud environment. Some or all nodes in the system execute across multiple servers (which can range from 3 to more than 100 for larger clusters), and may behave as a single entity. In such systems, a distributed metadata store service (that controls access to the distributed metadata store instance 220) may provide abstractions over multiple servers that span one or more physical racks in a data center. Other components of the system, such as the job runner service 210 (e.g., a distributed job runner responsible for running backup, archival and restore jobs) and the file system 205 (e.g., a distributed file system responsible for storing all backup data for assets protected by a given cluster) may rely on the distributed metadata store service to function properly.

Although described in the context of the file system 205 and the job runner service 210, it is to be understood that other services and applications running on (or supported by) the storage node 185-*b* may also use or access metadata stored in the distributed metadata store instance 220. For example, other snapshot management services, backup and recovery services, or data management applications not depicted in the example of FIG. 2 may interact with the distributed metadata store instance 220 using various query languages and protocols. These services and applications may communicate with the distributed metadata store instance 220 directly (for example, using SQL) or indirectly (via an intermediate protocol proxy 215 that uses CQL). In some examples, a first service or application running on the storage node 185-*b* may access the distributed metadata store instance 220 by calling or otherwise invoking a second (related) service or application running on the storage node 185-*b*.

The file system 205 and the job runner service 210 expect the distributed metadata store service to maintain and expose data with atomicity, consistency, isolation, and durability (ACID). For example, the file system 205 stores backup data in the form of data blocks that are spread across multiple disks on multiple servers (also referred to as node) in a cluster. However, the file system 205 may be unable to assemble these data blocks without metadata that describes the logical file the data blocks belong to and the order in which the data blocks are assembled. Hence, other systems and services may be reliant on the availability of the distributed metadata store service. Moreover, the consistency of metadata provided by the distributed metadata store service ensures that all services in a cluster function correctly (e.g., by presenting the correct data to a user when a restore from a backup is requested).

To access the distributed metadata store service, the file system 205 and the job runner service 210 may issue metadata access requests to an intermediate protocol proxy 215 that interfaces with the distributed metadata store service. At 225, the intermediate protocol proxy 215 may receive a metadata access request from one or both of the file system 205 or the job runner service 210 prior to the start of a metadata upgrade. The storage node 185-*b*, the file system 205, the job runner service 210, the intermediate protocol proxy 215, and the distributed metadata store instance 220 may be operating according to a first version (ver. x). The metadata access request may have a Cassandra wire-protocol and Querying Language (CQL) access label such as get, iterate, persist, etc. The metadata access request may be directed to a CQL component of the intermediate protocol proxy 215. The CQL component may send the metadata access request (e.g., a labeled access request with ver. x semantics) to a base load store primitive (LSP) component (also referred to as BaseLSP), which may execute the metadata access request by reading or writing to one or more rows or columns of the distributed metadata store instance 220.

At 230, the intermediate protocol proxy 215 may receive a metadata access request from one or both of the file system 205 or the job runner service 210 when a metadata upgrade is in progress. The storage node 185-*b*, the file system 205, the job runner service 210, and some components of the intermediate protocol proxy 215 may be operating according to the first version (ver. x), while other components of the intermediate protocol proxy 215 may be operating according to a second version (ver. y). The metadata access request may have a CQL access label such as get, iterate, persist, etc. A CQL component of the intermediate protocol proxy 215 may receive and relay the labeled access request (ver. x semantics) to an LSP access component of the intermediate protocol proxy 215 (referred to as AccessLSP).

As described herein, the first version (ver. x) may refer to the current (source) software version running on the cluster at the start of a metadata upgrade process. The second version (ver. y) may refer to the target software version running on the cluster if the metadata upgrade process is completed successfully (e.g., the software version to which the cluster is being upgraded). Hence, the first version of the distributed metadata store instance 220 may correspond to the state of the distributed metadata store instance 220 before a metadata upgrade or after an unsuccessful metadata upgrade, whereas the second version of the distributed metadata store instance 220 may correspond to the state of the distributed metadata store instance 220 after a successful metadata upgrade.

The LSP access component (ver. y) may engage an LH component of the intermediate protocol proxy 215 and output an unlabeled access request with a translated semantic format (ver. y semantics) to an LSP migration component of the intermediate protocol proxy 215 (referred to as MigrateLSP). Accordingly, the LSP migration component (ver. y) may migrate one or more rows indicated by the metadata access request (e.g., rows that include the requested metadata). The LSP migration component may upgrade (migrate) metadata on the fly, and may be capable of supporting multiple access. Once the row migration is complete, the LSP migration component may send the migrated access request to a base LSP component of the intermediate protocol proxy 215 (ver. x), which may execute the access request by reading or writing to one or more rows or columns of the distributed metadata store instance.

Aspects of the computing environment 200 may be implemented to realize one or more of the following advantages. The techniques described with reference to FIG. 2 may enable a DMS to apply complex metadata changes on the fly without disrupting services that are accessing the metadata in parallel. Moreover, the DMS may be able to present services and applications (such as the file system 205 or the job runner service 210) with an expected view of metadata, even if the actual metadata representation is evolving (due to ongoing upgrades). The described techniques may also support safe metadata access for both old and new versions of services, thereby providing access to the same set of rows at substantially the same time with fully interleaved access while avoiding an inherently higher risk of metadata corruption.

Additionally, the computing environment 200 may support techniques for retaining and improving the ability to make large, complex changes to the structure and/or representation of metadata using semantic changes (SCh) and techniques for retaining and improving the flexibility to make any logical change without restrictions on forward compatibility with previous releases. Compatibility may be expressed in retrospect, with complete, up-to-date information on a change at the time the change is introduced. Furthermore, the techniques and operations described herein make representation changes performant and scalable for large tables, which may improve the reliability of such operations (in the event of a failure) and enable both inter-change and intra-change parallelism. Additionally, or alternatively, the techniques described with reference to FIG. 2 may enable a DMS to backport changes from an active development branch to a branch of a current release. In contrast, backport of post-up scripts may not be supported, leading component owners to use undesirable workarounds when a change was needed for such branches.

Figure 3:
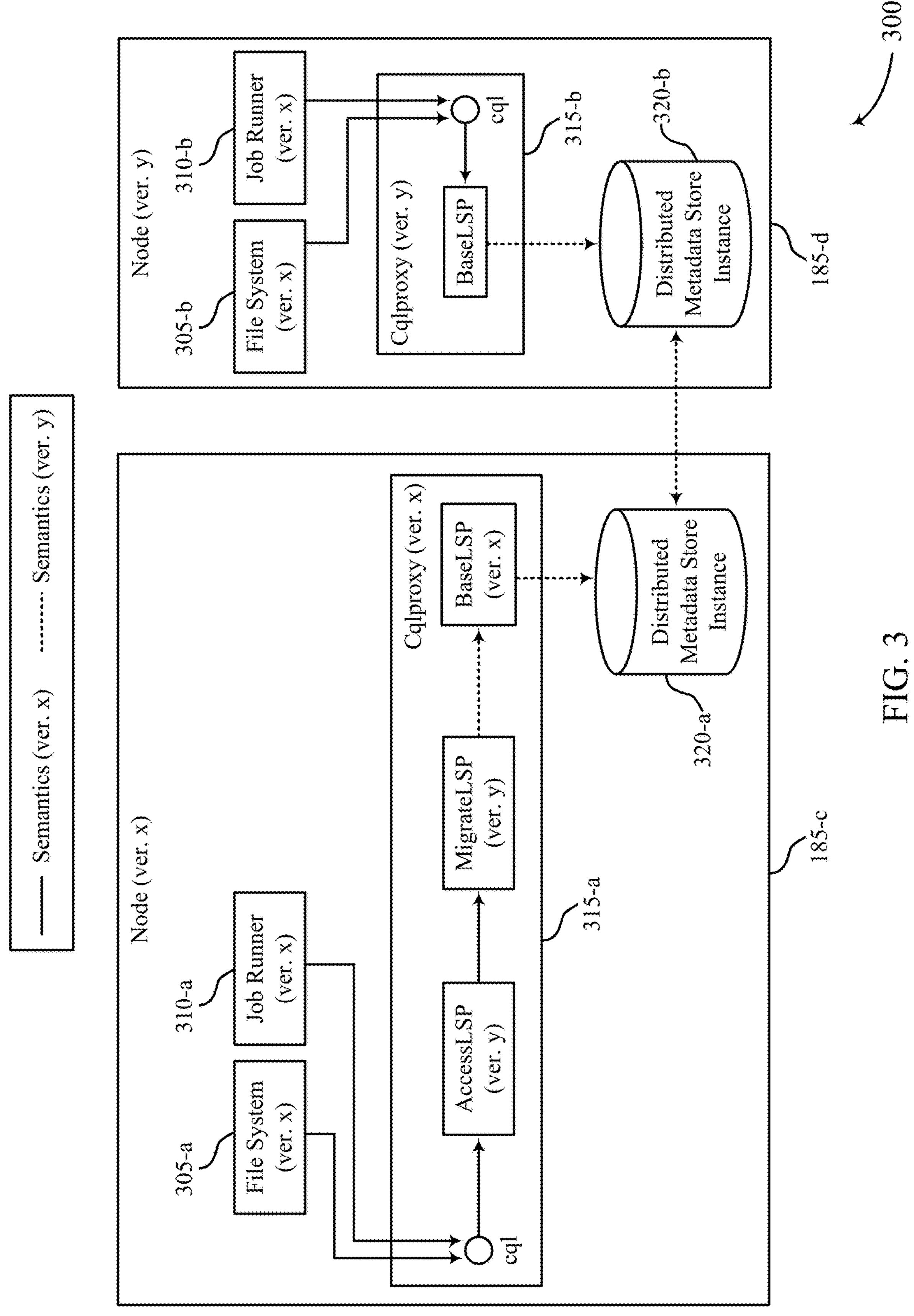

FIG. 3 illustrates an example of a computing environment 300 that supports techniques for upgrading and accessing metadata in accordance with aspects of the present disclosure. The computing environment 300 may implement or be implemented by aspects of the computing environment 100 or the computing environment 200. For example, the computing environment 300 may include a storage node 185-*c* and a storage node 185-*d*, which may be examples of the storage node 185-*b* described with reference to FIG. 2. The storage node 185-*c* may include an intermediate protocol proxy 315-*a* that interfaces with a file system 305-*a*, a job runner service 310-*a*, and a distributed metadata store instance 320-*a*. Likewise, the storage node 185-*d* may include an intermediate protocol proxy 315-*b* that interfaces with a file system 305-*b*, a job runner service 310-*b*, and a distributed metadata store instance 320-*b*. The storage node 185-*c* may be operating according to a first version (ver. x), while the storage node 185-*d* may be operating according to a second version (ver. y).

Services in the computing environment 300 (e.g., the job runner services 310 and the file systems 305) may have the ability to define the structure and associate meaning with the metadata they own and store in a distributed metadata store service that controls access to the distributed metadata store instances 320. This ability enables components to perform a wide range of actions such as running jobs, managing redundancy of data in the event of a lost node, etc. Hence, the metadata owned and used by each component may be structured differently for each component (to meet the objectives of that component).

In some systems, a cluster of storage nodes 185 may be upgraded in a disruptive manner, where all services are shut down before any upgrade-related operations are performed. This ensures that upgrade routines have ownership of a cluster state while an upgrade is in progress. Thus, system administrators can manipulate a cluster state (including the metadata) to prepare the cluster for a new version of the services before the services come back online (at the end of upgrade). However, in such scenarios, the cluster is offline, and users are unable to acquire backups or use the cluster for critical restore operations while the cluster is upgraded.

Rolling (disruption-free) upgrades solve this issue by upgrading a cluster in a manner that does not disrupt duties the cluster is configured to perform. As such, all services may continue to perform respective duties (functions) while new versions of services replace old instances of the services. To support this functionality, the distributed data management service (which controls access to the distributed metadata store instances 320) may be available to ensure the consistency of metadata throughout the upgrade period.

In the example of FIG. 3, one or more of the file systems 305 or job runner services 310 may transmit a metadata access request while a metadata upgrade is in progress. For example, one or both of the file system 305-*a* (ver. x) or the job runner service 310-*a* (ver. x) may transmit a metadata access request to a CQL component of the intermediate protocol proxy 315-*a*. The metadata access request may have a CQL access label such as get, iterate, persist, etc. The CQL component may send the labeled access request (ver. x semantics) to an LSP access component of the intermediate protocol proxy 315-*a*. In turn, the LSP access component (ver. y) may engage an LH component of the intermediate protocol proxy 315-*a* and send an unlabeled access request (ver. y semantics) to an LSP migration component of the intermediate protocol proxy 315-*a*.

The LSP migration component may be configured to migrate one or more rows indicated by the unlabeled access request and send the migrated access request to a base LSP component of the intermediate protocol proxy 315-*a*., as described with reference to FIG. 2, the LSP migration component may upgrade (migrate) metadata on the fly, and may be capable of supporting multiple access. Once the base LSP component receives the access request from the LSP migration component, the base LSP component may execute the access request by reading or writing to one or more rows or columns of the distributed metadata store instance 320-*a*.

As another example, one or both of the file system 305-*b* (ver. x) or the job runner service 310-*b* (ver. x) of the storage node 185-*d* may transmit a metadata access request to the intermediate protocol proxy 315-*b* (ver. y). The metadata access request may have a CQL access label such as get, iterate, persist, etc. A CQL component of the intermediate protocol proxy 315-*b* may provide the labeled access request (ver. y semantics) to a base LSP component of the intermediate protocol proxy 315-*b*, which may support both versions (ver. x and ver. y). Accordingly, the base LSP component may execute the access request by reading or writing to one or more rows or columns of the distributed metadata store instance 320-*b*. In some examples, the distributed metadata store instance 320-*a* (of the storage node 185-*c*) may communicate with or access data stored in the distributed metadata store instance 320-*b* (of the storage node 185-*d*).

Figure 4:
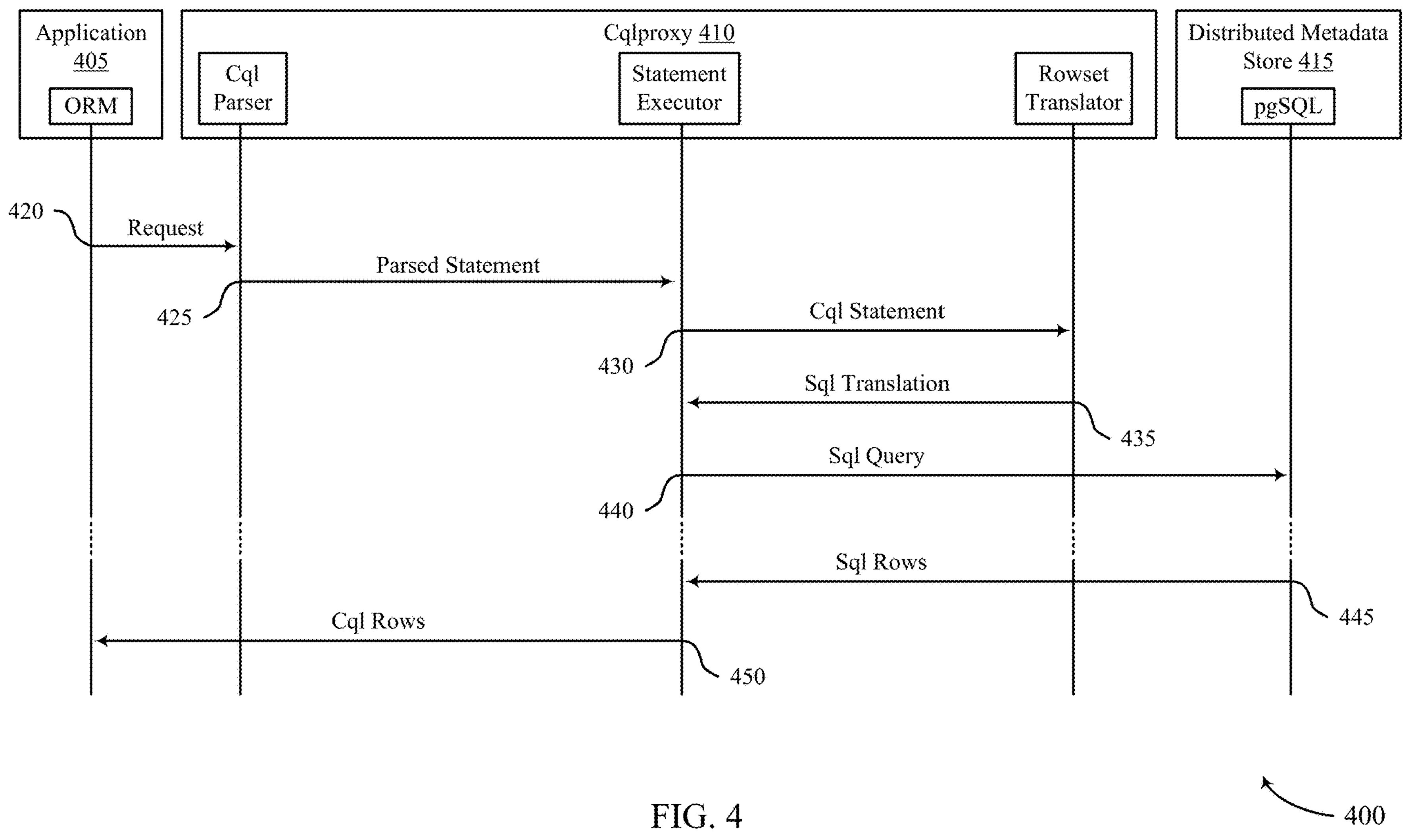
FIGS. 4, 5A, 5B, and 6 illustrate examples of process flows that support techniques for upgrading and accessing metadata in accordance with aspects of the present disclosure.

FIG. 4 illustrates an example of a process flow 400 that supports techniques for upgrading and accessing metadata in accordance with aspects of the present disclosure. The process flow 400 may implement or be implemented by aspects of any of the computing environments described with reference to FIGS. 1 through 3. For example, the process flow 400 may include an intermediate protocol proxy 410 (also referred to as cqlproxy), which may be an example of the intermediate protocol proxy 215 described with reference to FIG. 2. The process flow 400 may also include a distributed metadata store 415, which may be an example of the distributed metadata store instances 320 described with reference to FIG. 3. In the following description of the process flow 400, operations between the intermediate protocol proxy 410, the distributed metadata store 415, and an application 405 may be added, omitted, or performed in a different order (with respect to the exemplary order shown).

Due to the diverse arrangement and layout of metadata used in a DMS, enabling multiple versions of services to access metadata at substantially the same time presents logistical challenges. The version of services deployed in a new release may have the ability to control the type of changes in the arrangement or layout of metadata to support the evolution of existing or new features added in a release. In some implementations, post-up scripts (e.g., free-form python scripts that can apply changes to metadata) are used to manipulate metadata by means of schematic changes (e.g., structural changes to metadata, such as the addition of new columns) and representational changes (e.g., changes to metadata stored in column, possibly for a subset of rows). These mechanisms may be engaged and operated during an upgrade process, and may depend on having exclusive access to metadata. These mechanisms may result in half-migrated metadata (breaking dependent services for several minutes), provided that the upgrade routines all issues before dependent services are brought back online.

For RU, however, services stay online throughout the upgrade process. Thus, alternative approaches may be used to support RU. The techniques described herein utilize a metadata access (MA) component (also referred to as MetadataAccess) and an RM component (also referred to as RowMigrator) to support rolling metadata upgrades. The MA component enables two different versions of a service to perform read and write operations to metadata at substantially the same time without breaking other services or violating the sanctity of metadata. The RM component enables service owner teams to implement metadata upgrade routines in a rolling (disruption-free) manner such that upgrade routines can be applied incrementally without breaking or adversely impacting other services that rely on the metadata.

In some examples, the application 405 may access the distributed metadata store 415 via CQL using Cqlproxy (which is a protocol proxy that exposes CQL-protocol and associated data models) over an underlying metadata store (a third-party distributed database). In such examples, metadata access may be indirectly channeled through Cqlproxy (the intermediate protocol proxy 410). In other examples, the application 405 may access the distributed metadata store 415 directly (without Cqlproxy) using SQL or another query language supported by the distributed metadata store 415. A passive path of a semantic change stack (SChStack) that hosts the MA and RM sub-components and handles SCh management may be loaded as part of Cqlproxy. The passive path entity may intercept CQL-based metadata access queries from the application 405 and ensure that each query is processed correctly.

The process flow 400 illustrates an example of a CQL-based metadata access with a single semantic version (e.g., a steady state access with no upgrade in progress). At 420, an object relational mapping (ORM) component of the application 405 may transmit a metadata access request to a CQL parsing component of the intermediate protocol proxy 410 (CQL Parser). The metadata access request may have an access type such as select, update, etc. At 425, CQL parsing component may parse the metadata access request and send the parsed statement to a statement executing component of the intermediate protocol proxy 410 (Statement Executor). At 430, the statement executing component may transmit a CQL statement to a row translating component of the intermediate protocol proxy 410 (Rowset Translator).

At 435, the row translating component may send a Structured Query Language (SQL) translation of the CQL statement back to the statement executing component. At 440, the statement executing component may transmit a SQL query to a PostgreSQL (pgSQL) component of the distributed metadata store 415. At 445, the pgSQL component may return one or more SQL rows to the statement executing component in response to the SQL query. In some examples, the operations of 420 through 440 may be repeated one or more times before proceeding to 445. At 450, the statement executing component may transmit an indication of one or more CQL rows (corresponding to the one or more SQL rows) to the ORM component of the application 405.

Figure 5A:
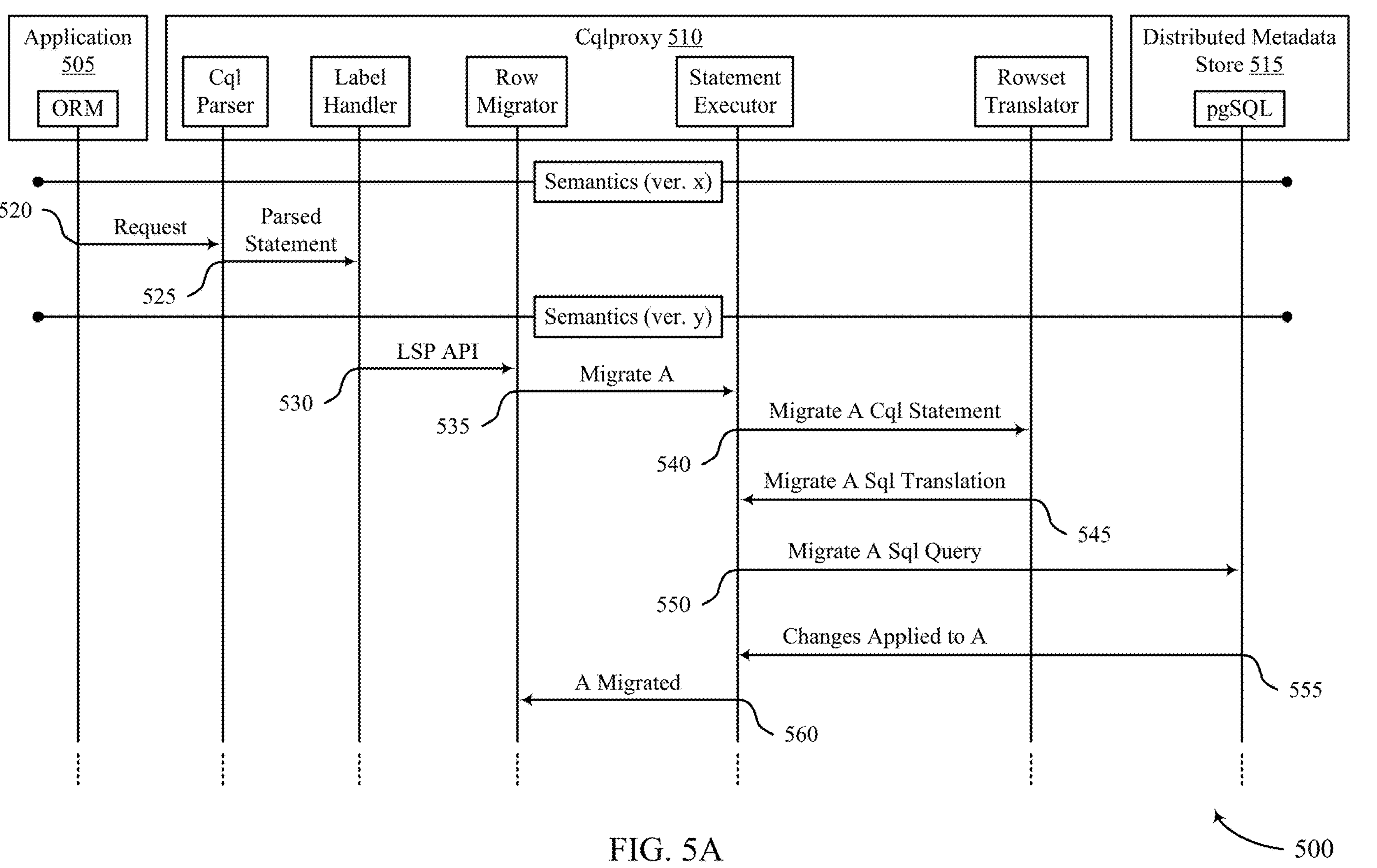
Figure 5B:
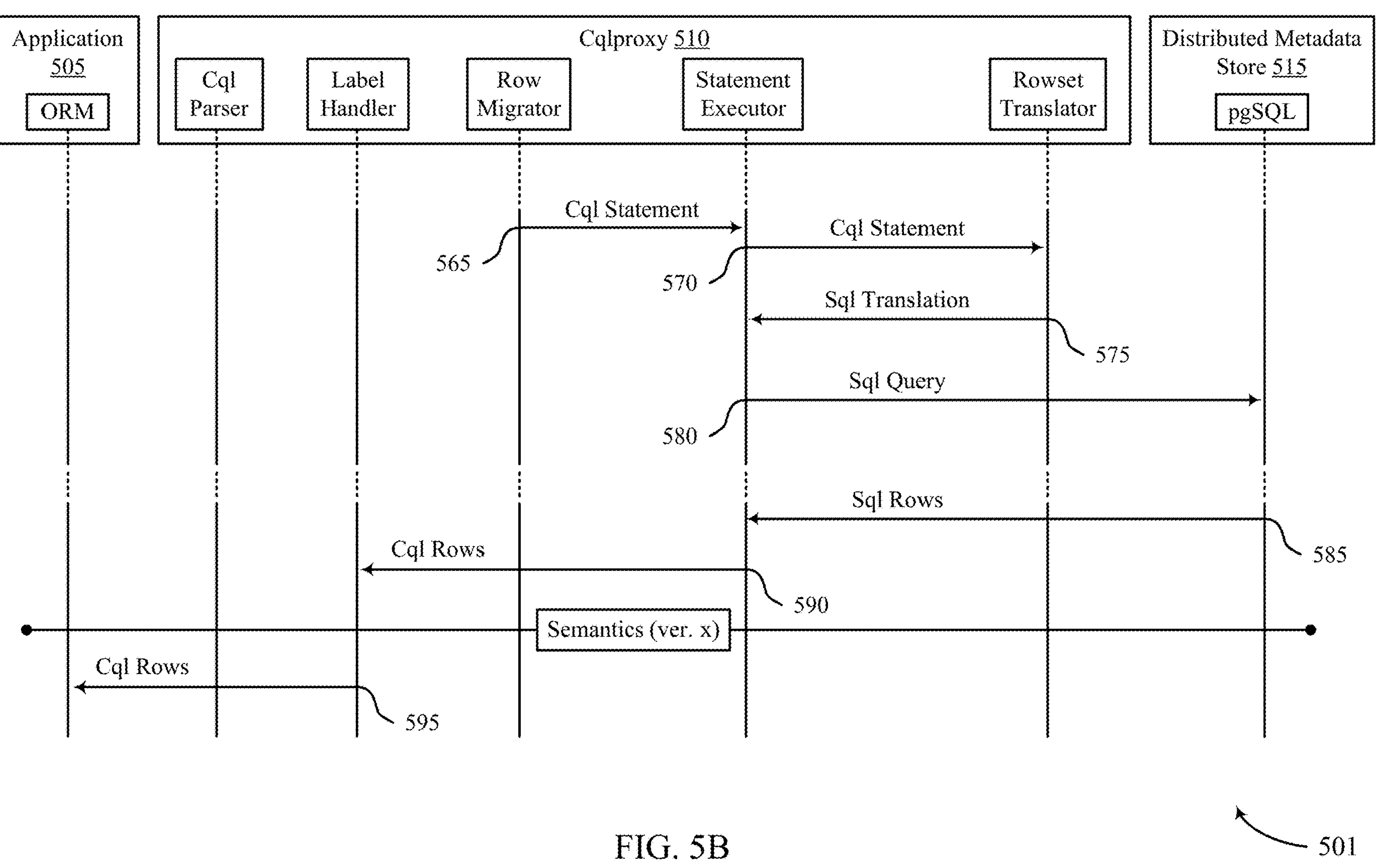

FIGS. 5A and 5B illustrate examples of a process flow 500 and a process flow 501 that support techniques for upgrading and accessing metadata in accordance with aspects of the present disclosure. The process flow 500 and the process flow 501 may implement or be implemented by aspects of any of the computing environments and process flows described with reference to FIGS. 1 through 4. For example, the process flow 500 and the process flow 501 may include an application 505, an intermediate protocol proxy 510, and a distributed metadata store 515, which may be examples of corresponding elements described with reference to FIGS. 1 through 4. In the following description of the process flow 500 and the process flow 501, operations between the application 505, the intermediate protocol proxy 510, and the distributed metadata store 515 may be added, omitted, or performed in a different order (with respect to the exemplary order shown). The process flow 500 and the process flow 501 illustrate an example of a first CQL access with dual semantics (e.g., a first metadata access during an ongoing metadata upgrade).

As described herein, the intermediate protocol proxy 510 may include an MA component (referred to as MetadataAccess) that is capable of identifying an appropriate interceptor for each access based on a type of access (select, update), a table identifier, and a use case identifier. When an SCh is introduced, the component making the change adds forward compatibility support in the form of an LH component (also referred to as LabelHandler). The MA component loads and engages the LH component when a matching metadata access request is issued by the application 505. The LH component has access to an abstraction called LSP, which enables the LH component to read or write to any row of any table in the distributed metadata store 515. The LH component may be configured to implement the effect of the access request, while LSP enables the LH component to translate the metadata access request to a form that is compatible with a new (upgraded) data model of the distributed metadata store 515.

Applying forward compatibility supports provides component owners with design freedom when developing new features because LH component(s) are bundled as part of a release and injected (loaded) dynamically into the Cqlproxy instance running as part of a previous release on a given cluster of storage nodes. This helps mitigate issues that result from having to anticipate the forward compatibility needed to support new features in a release. Dependence on such information may result in manually-intensive and error-prone development processes. The techniques described herein retain the flexibility that component teams have with disruptive upgrades (e.g., when introducing features that involve significant changes to a metadata model).

SChStack ensures that LH components only interact with upgraded metadata, which simplifies the implementation of the LH component. Thus, the LH component may not interact with intermediate versions of metadata or obtain an inconsistent view of metadata, even if row upgrades are being performed at substantially the same time. To support this functionality, the MA component (which includes the LH component) may be stacked over the RM component, which is used to migrate or upgrade metadata on the fly by analyzing metadata access requests and ensuring that metadata has been migrated before metadata access is unblocked.

At 520, an ORM component of the application 505 may transmit a metadata access request (ver. x semantics) to a CQL parsing component of the intermediate protocol proxy 510. The metadata access request may have an access type such as select, update, etc. At 525, the CQL parsing component may parse the metadata access request and send the parsed statement (ver. x semantics) to an LH component of the intermediate protocol proxy 510 (referred to as Label Handler). At 530, the LH component may translate the parsed statement to a second semantic version (ver. y semantics) and invoke an LSP API to handle metadata access.

At 535, an RM component of the intermediate protocol proxy 510 (also referred to as RowMigrator) may upgrade or migrate a first set of rows (denoted by A) indicated by the translated statement, and may transmit an indication of the migrated rows (Migrate A) to a statement executing component of the intermediate protocol proxy 510. At 540, the statement executing component may transmit a CQL statement to a row translating component of the intermediate protocol proxy 510 based on the information provided by the RM component. At 545, the row translating component may transmit a corresponding SQL translation of the CQL statement to the statement executing component. At 550, the statement executing component may transmit a SQL query to a pgSQL component of the distributed metadata store 515 based on the SQL translation provided by the row translating component.

At 555, the pgSQL component may execute the SQL query (for example, by reading or writing to one or more rows of the distributed metadata store 515) and transmit an indication of any applied changes to the statement executing component. At 560, the statement executing component may receive the indication from the pgSQL component and inform the RM component that the first set of rows (A) have been successfully migrated. After migrating the first set of rows, the operations of 520 through 560 may be repeated for a second set of rows (B), a third set of rows (C), etc. At 565 (following successful migration of all requested metadata), the RM component may transmit a CQL statement to the statement executing component. At 570, the statement executing component may direct the CQL statement to the row translating component, which may provide the statement executing component with a corresponding SQL translation at 575.

At 580, the statement executing component may transmit a SQL query to the pgSQL component based on the SQL translation provided by the row translating component. In some examples, the operations of 565 through 580 may be repeated one or more times before proceeding to 585. At 585, the pgSQL component may transmit an indication of one or more SQL rows to the statement executing component (in response to the SQL query). At 590, the statement executing component may transmit an indication of one or more corresponding CQL rows to the LH component. At 595, the LH component may translate the SQL query results (e.g., the one or more CQL rows) to the first semantic version (ver. x semantics) and provide the translated query results to the ORM component of the application 505.

Figure 6:
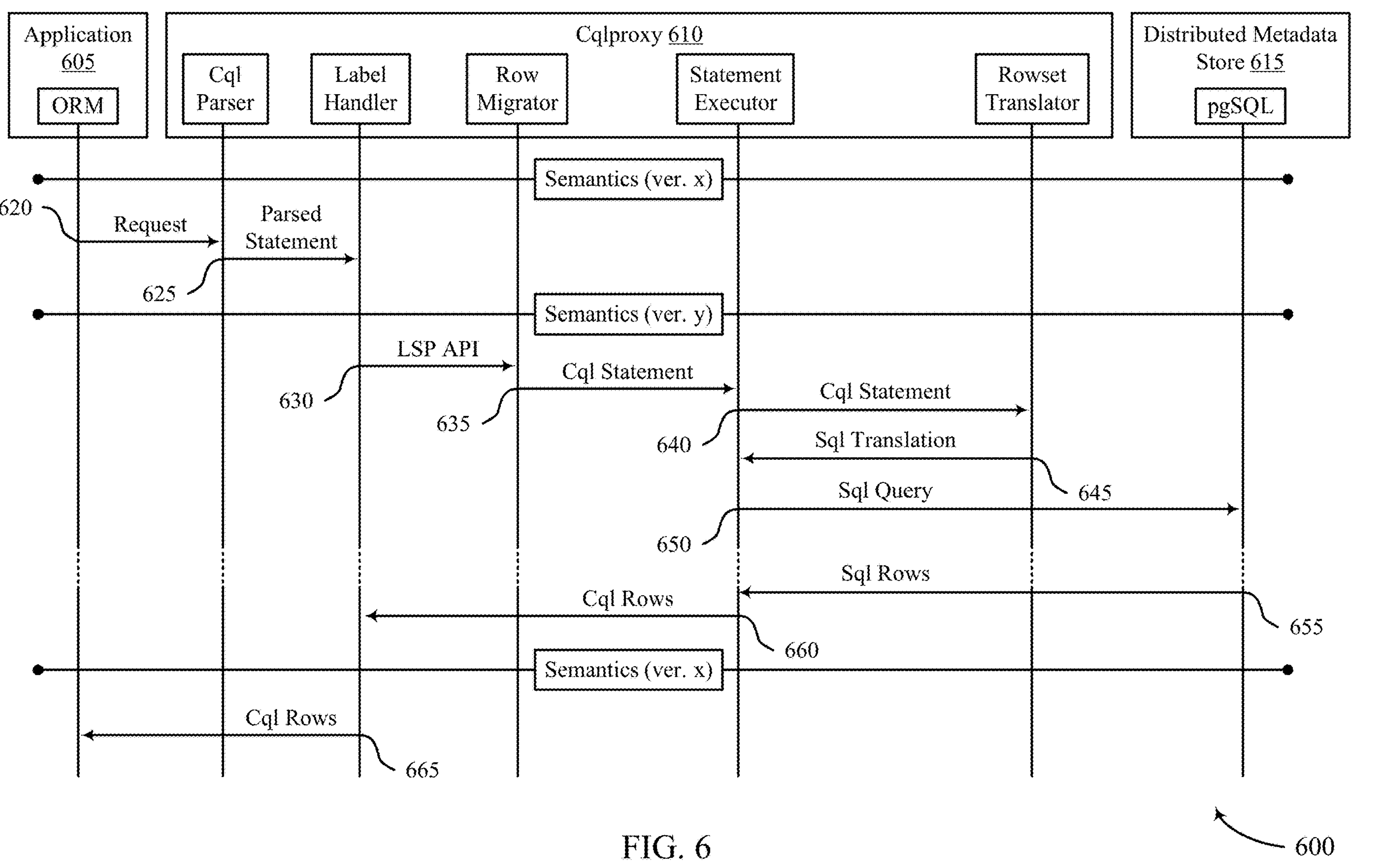

FIG. 6 illustrates an example of a process flow 600 that supports techniques for upgrading and accessing metadata in accordance with aspects of the present disclosure. The process flow 600 may implement or be implemented by aspects of any of the computing environments and process flows described with reference to FIGS. 1 through 5. For example, the process flow 600 may include an application 605, an intermediate protocol proxy 610, and a distributed metadata store 615, which may be examples of corresponding elements described with reference to FIGS. 1 through 5. In the following description of the process flow 600, operations between the application 605, the intermediate protocol proxy 610, and the distributed metadata store 615 may be added, omitted, or performed in a different order (with respect to the exemplary order shown).

As described herein, the intermediate protocol proxy 610 illustrated in the process flow 600 may include an RM component (also referred to as RowMigrator). The RM component is a part of SChStack, and is engaged in both active and passive path operations. Passive path refers to the path of metadata access performed by the application 605. Passive path responds to metadata access performed by the application 605 during an upgrade (that is, when metadata is being changed from a representation expected by a first version to a representation that is expected by a second version). Metadata that is accessed by the application 605 during an upgrade may be migrated on the fly. Once upgraded, this metadata may be compatible with the second version. However, access by the application 605 during an upgrade may sometimes be unavailable. In passive path, the RM component may not upgrade metadata unless the metadata is requested by the application 605. This keeps the passive path responsive by migrating only portions of metadata that are needed to respond to the application 605.

The application 605 may, in some examples, have to wait while the requested metadata is migrated. Migrating extraneous metadata may be is undesirable because such migrations affect the responsiveness of the application 605. To avoid extraneous migrations in passive path, the RM component may have an active mode of engagement (called active path) which seeks and migrates metadata that has not been migrated (upgraded) by the time the metadata is reached. The active path may not perform this operation in response to queries from the application 605. Rather, the active path may be based on a catalog of changes to be applied and bookkeeping information maintained by the RM component while migrating metadata representations. Once all changes in the catalog are fully applied, the metadata upgrade is considered complete.

Upon completion of a metadata migration (e.g., after active path is complete), nodes in the cluster may be rebooted one by one, loading new versions of services while old instances of services continue functioning on nodes that have yet to be rebooted. New versions of services can access metadata without additional interception or translation because the metadata is natively represented in the desired format once the active path of the RM component is complete. In contrast, the MA component in the passive path of the intermediate protocol proxy 610 may translate all accesses performed by previous versions of services (using a LH component) and enable these services to operate on metadata that is natively incompatible with the old versions of the services.

Once all nodes in a cluster have been upgraded to the new software version, neither the MA component nor the RM component are needed until the next upgrade. As such, these components may be removed from the passive path. The RM component may express changes as scala code called metadata changes (also referred to as MCs or MetadataChange objects). MCs declare columns (by table) to be read from or written to, and are ordered by version (similar to post-up scripts). However, unlike post-up scripts, because the RM component can determine source and target sites for possible effects, the RM component can identify changes that are independent of other changes, and can safely execute these changes in parallel.

To support parallel change execution, the RM component may generate a dependency graph and identifying changes that are independent of other changes. The RM component may then apply these changes in parallel. As changes are successfully applied, the applied changes unblock other changes that depend on the resulting effects. For example, a change to a table used by a job runner service (e.g., the job runner service 210 described with reference to FIG. 2) and a change to a table associated with a file system (e.g., the file system 205 described with reference to FIG. 2) can be applied in parallel, whereas another change that modifies one or more rows in the table associated with the job runner service based on data in the table associated with the file system may only be applied once both former changes are applied.

The RM component may use this dependency information to support parallel intra-MC execution. Also, applying changes at a granular level may support RU, as large quantities of metadata manipulations in the passive path can lead to query timeouts and application unresponsiveness. The RM component may operate on the basis of change units (referred to as ChangeUnits or CUs), and may apply changes at the granularity of a single CU. These CUs partition the metadata space into granular elements. The RM component utilizes this granularity to support parallel intra-change execution. The RM component may also improve the failure tolerance of metadata upgrades because migration occurs a few CUs (possibly just one CU) at a time. This granularity, combined with upgrade retries, may result in higher failure resilience and more reliable, faster metadata upgrades.

As described with reference to FIG. 5, the process flow 500 illustrates an example of a first CQL access with dual semantics, whereas the process flow 600 illustrates an example of a subsequent CQL access with dual semantics (e.g., a subsequent metadata access during an ongoing metadata upgrade). At 620, an ORM component of the application 605 may transmit a metadata access request (ver.

x semantics) to a CQL parsing component of the intermediate protocol proxy 610. The metadata access request may have an access type such as select, update, etc. At 625, the CQL parsing component may parse the metadata access request and send the parsed statement (ver. x semantics) to an LH component of the intermediate protocol proxy 610 (referred to as LabelHandler). At 630, the LH component may translate the parsed statement to a second semantic version (ver. y semantics) and invoke an LSP API to handle metadata access.

At 635, an RM component of the intermediate protocol proxy 610 (RowMigrator) may transmit a CQL statement to the statement executing component. At 640, the statement executing component may direct the CQL statement to the row translating component, which may return a corresponding SQL translation to the statement executing component at 645. At 650, the statement executing component may transmit a SQL query to a pgSQL component of the distributed metadata store 615 based on the SQL translation provided by the row translating component. In some examples, the operations of 620 through 650 may be repeated one or more times before proceeding to 655. At 655, the pgSQL component may transmit an indication of one or more SQL rows to the statement executing component (in response to the SQL query). At 660, the statement executing component may transmit an indication of one or more corresponding CQL rows to the LH component. At 665, the LH component may translate the SQL query results (e.g., the one or more CQL rows) to the first semantic version (ver. x semantics) and provide the translated query results to the ORM component of the application 605.

Figure 7A:
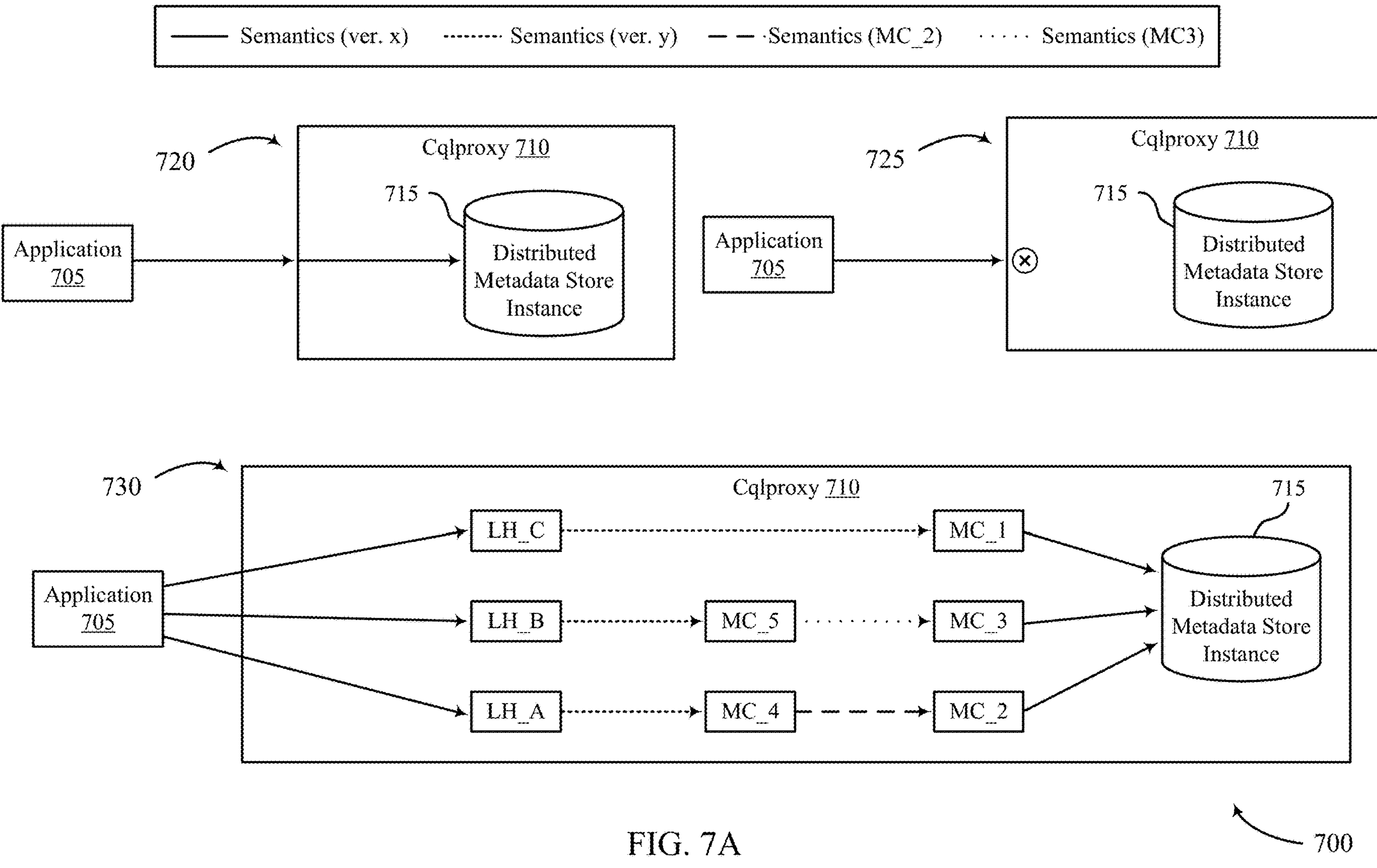
FIGS. 7A and 7B illustrate examples of computing environments that support techniques for upgrading and accessing metadata in accordance with aspects of the present disclosure.
Figure 7B:
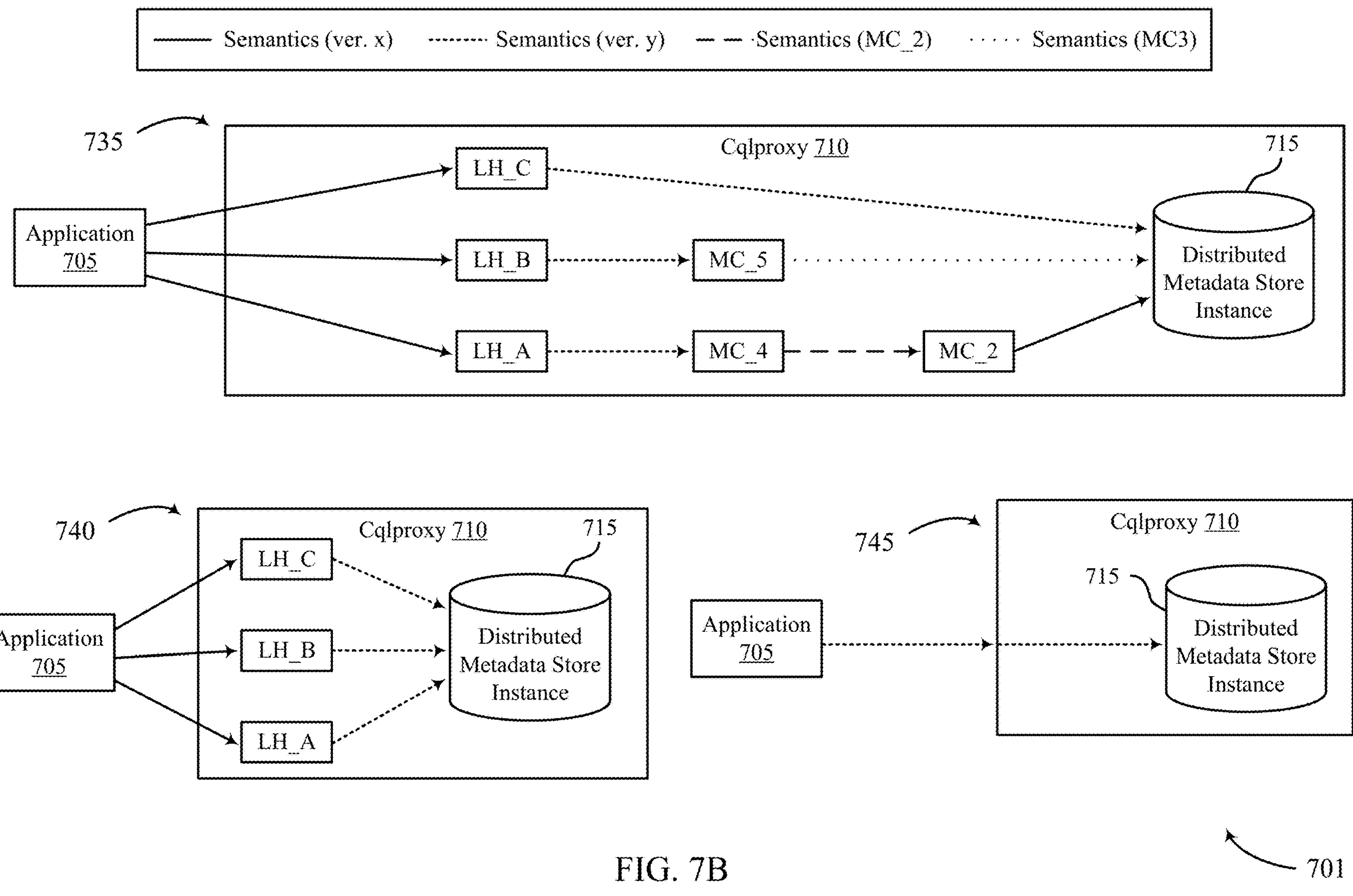

FIGS. 7A and 7B illustrate examples of a computing environment 700 and a computing environment 701 that support techniques for upgrading and accessing metadata in accordance with aspects of the present disclosure. The computing environment 700 and the computing environment 701 may implement or be implemented by aspects of any of the computing environments and process flows described with reference to FIGS. 1 through 6. For example, the computing environment 700 and the computing environment 701 may include an application 705, an intermediate protocol proxy 710, and a distributed metadata store instance 715, which may be examples of corresponding elements described with reference to FIGS. 1 through 6. The computing environment 700 and the computing environment 701 illustrate various stages of a metadata upgrade and how metadata access requests are handled at each stage.

At 720, the application 705 may issue a metadata access request while no upgrade-related activity is in progress (e.g., prior to a metadata upgrade). The intermediate protocol proxy 710 may process the metadata access request (ver. x) from the application 705 based on a label (a, b, or c) in the metadata access request. Before starting a metadata upgrade, a DMS (e.g., the DMS 110 described with reference to FIG. 1) may apply one or more additive structural changes to the distributed metadata store instance 715 and load one or more libraries (ver. y) for LH and RM components of the intermediate protocol proxy 710.

At 725, the DMS may quiesce for a switch from a first semantic version (ver. x semantics) to a second semantic version (ver. y semantics). While the DMS is preparing to switch between semantic versions, metadata access requests from the application 705 may be temporarily blocked. Once the DMS has successfully switched to the second semantic version, the DMS may visit all rows across all tables of the distributed metadata store instance 715 and migrate any visited rows (if not already migrated). While the distributed metadata store instance 715 is being upgraded (at 730), the intermediate protocol proxy 710 may engage one or more LH components and RM components to enforce the second semantic version and handle metadata access requests from the application 705.

The intermediate protocol proxy 710 may route a metadata access request from the application 705 to a corresponding LH component based on a label in the metadata access request. For example, a metadata access request with a label "C" may be routed to LH_C, a metadata access request with a label "B" may be directed to LH_B, etc. The designated LH component (LH_A, LH_B, or LH_C) may translate the metadata access request from the first semantic version (ver. x) to the second semantic version (ver. y). An RM component may then determine whether to apply one or more metadata changes to a request based on a status of the branch associated with the request, where a branch is defined by the label in the metadata request and the designated LH component. For example, the RM component may apply a first metadata change (MC_1) to requests associated with LH_C, a fifth metadata change (MC_5) to requests associated with LH_B, and a fourth metadata change (MC_4) to requests associated with LH_A.

In some examples, the RM component may apply multiple metadata changes to a given request. For example, the RM component may apply a third metadata change (MC_3) to a request associated with LH_B after applying MC_5. To support this functionality, the output of MC_5 (e.g., the metadata access request with MC_5 applied) may be formatted according to the semantics used on the branch when MC_3 was authored. Similarly, the RM component may apply a second metadata change (MC_2) to a request associated with LH_A after MC_4 is applied. Hence, the output of MC_4 (e.g., the metadata access request with MC_4 applied) may be formatted according to the semantics used on the branch when MC_2 was authored. The outputs of MC_1, MC_3, and MC_2 may all be formatted according to the first semantic version (ver. x). Once the RM component has applied all MCs, the intermediate protocol proxy 710 may execute the metadata access request by reading or writing to one or more rows or columns of a table in the distributed metadata store instance 715.

At 735, the intermediate protocol proxy 710 may receive a metadata access request from the application 705 while the distributed metadata store instance 715 is in a partially upgraded state (e.g., after MC_1 and MC_3 have been fully applied). Thus, requests routed to or otherwise intercepted by LH_C may be executed without intervening metadata changes (because MC_1 has been fully applied). Similarly, requests routed to LH_B may be executed after the RM component applies MC_5 (because MC_3 has been fully applied). Since branch A is unchanged at 735, the RM component may still apply MC_4 and MC_2 to requests routed to LH_A.

At 740, the intermediate protocol proxy 710 may receive a metadata access request from the application 705 after the distributed metadata store instance 715 has been fully upgraded. In such examples, the application 705 may be operating according to a first version (ver. x), while the distributed metadata store instance 715 may be operating according to a second version (ver. y). In such examples, requests from the application 705 may be executed after the designated LH components have translated the requests from the first version to the second version (e.g., without any intervening metadata changes). Once the distributed metadata store instance 715 is fully upgraded, the DMS may initiate a rolling software stack restart and switch all services (e.g., the application 705) to the second version. The DMS may then perform various clean-up operations and apply destructive structural changes as needed.

At 745, the application 705 may submit a metadata access request to the intermediate protocol proxy 710 after switching to the second version (ver. y). In such examples, requests from the application 705 may be executed without any intervening metadata changes or semantic translations because the semantics of the request correspond to the semantics used in the distributed metadata store instance 715. Thus, all LH components and RM components may be disengaged after the distributed metadata store instance 715 and all relevant services have been fully upgraded.

Figure 8:
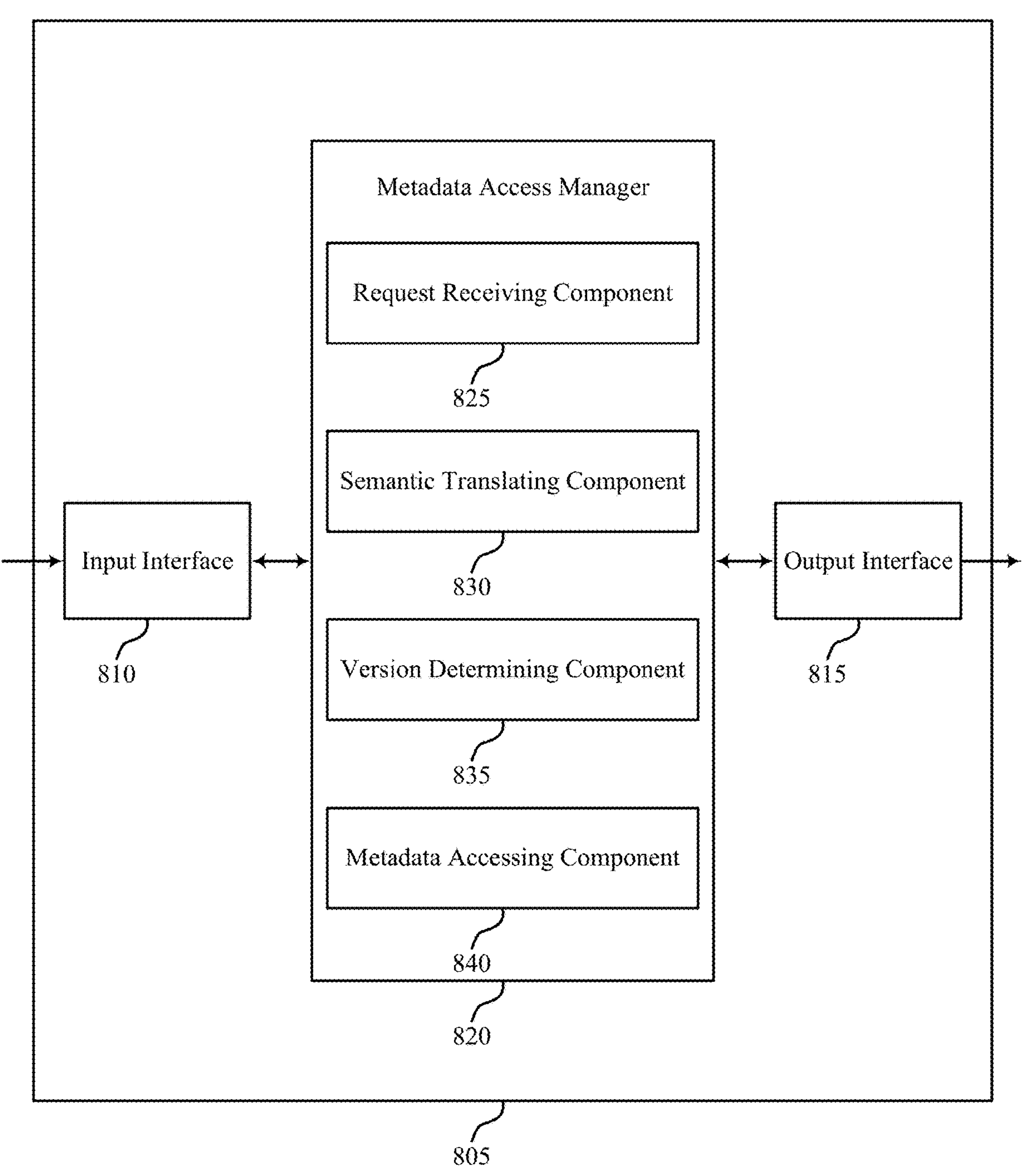
FIG. 8 shows a block diagram of an apparatus that supports techniques for upgrading and accessing metadata in accordance with aspects of the present disclosure.

FIG. 8 shows a block diagram 800 of a system 805 that supports upgrading and accessing metadata in accordance with aspects of the present disclosure. In some examples, the system 805 may be an example of aspects of one or more components described with reference to FIG. 1, such as a DMS 110. The system 805 may include an input interface 810, an output interface 815, and a metadata access manager 820. The system 805 may also include one or more processors. Each of these components may be in communication with one another (e.g., via one or more buses, communications links, communications interfaces, or any combination thereof).

The input interface 810 may manage input signaling for the system 805. For example, the input interface 810 may receive input signaling (e.g., messages, packets, data, instructions, commands, or any other form of encoded information) from other systems or devices. The input interface 810 may send signaling corresponding to (e.g., representative of or otherwise based on) such input signaling to other components of the system 805 for processing. For example, the input interface 810 may transmit such corresponding signaling to the metadata access manager 820 to support upgrading and accessing metadata. In some cases, the input interface 810 may be a component of a network interface 1015, as described with reference to FIG. 8.

The output interface 815 may manage output signaling for the system 805. For example, the output interface 815 may receive signaling from other components of the system 805, such as the metadata access manager 820, and may transmit such output signaling corresponding to (e.g., representative of or otherwise based on) such signaling to other systems or devices. In some cases, the output interface 815 may be a component of a network interface 1015, as described with reference to FIG. 8.

The metadata access manager 820 may include a request receiving component 825, a semantic translating component 830, a version determining component 835, a metadata accessing component 840, or any combination thereof. In some examples, the metadata access manager 820, or various components thereof, may be configured to perform various operations (e.g., receiving, monitoring, transmitting) using or otherwise in cooperation with the input interface 810, the output interface 815, or both. For example, the metadata access manager 820 may receive information from the input interface 810, send information to the output interface 815, or be integrated in combination with the input interface 810, the output interface 815, or both to receive information, transmit information, or perform various other operations as described herein.

The metadata access manager 820 may support data management in accordance with examples disclosed herein. The request receiving component 825 may be configured as or otherwise support a means for receiving a request to access a subset of metadata stored in a distributed metadata repository of a DMS, where the request has a first semantic format compatible with a first version of the distributed metadata repository. The semantic translating component 830 may be configured as or otherwise support a means for translating the first semantic format of the request to a second semantic format compatible with a second version of the distributed metadata repository, where the first semantic format of the request is translated according to a label in the request. The version determining component 835 may be configured as or otherwise support a means for determining whether a current version of the requested metadata corresponds to the first version of the distributed metadata repository or the second version of the distributed metadata repository. The metadata accessing component 840 may be configured as or otherwise support a means for accessing the requested metadata in the distributed metadata repository based on the current version of the requested metadata.

Figure 9:
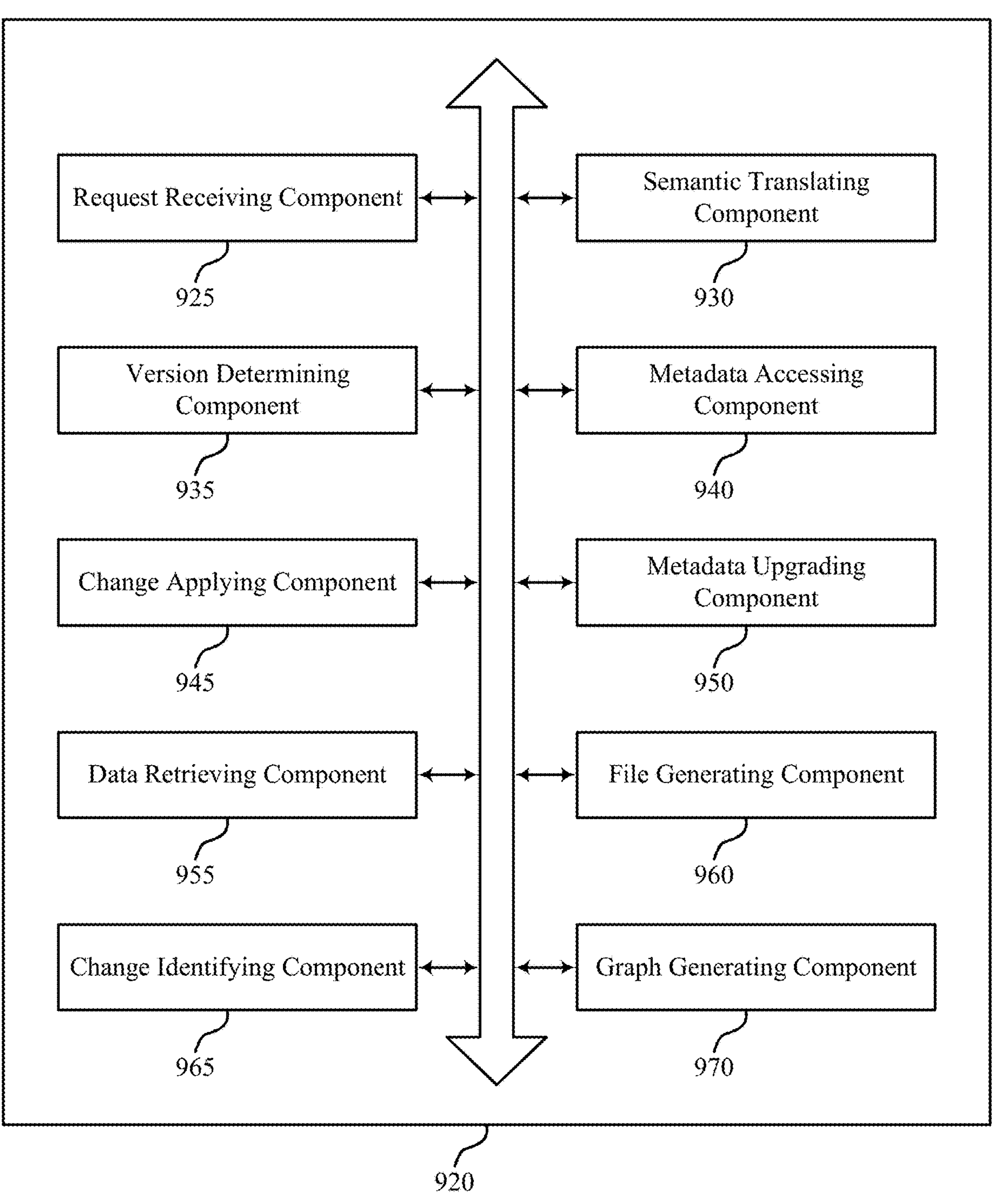
FIG. 9 shows a block diagram of a metadata access manager that supports techniques for upgrading and accessing metadata in accordance with aspects of the present disclosure.

FIG. 9 shows a block diagram 900 of a metadata access manager 920 that supports techniques for upgrading and accessing metadata in accordance with aspects of the present disclosure. The metadata access manager 920 may be an example of aspects of a metadata access manager 820, as described herein. The metadata access manager 920, or various components thereof, may be an example of means for performing various aspects of techniques for upgrading and accessing metadata as described herein. For example, the metadata access manager 920 may include a request receiving component 925, a semantic translating component 930, a version determining component 935, a metadata accessing component 940, a change applying component 945, a metadata upgrading component 950, a data retrieving component 955, a file generating component 960, a change identifying component 965, a graph generating component 970, or any combination thereof. Each of these components may communicate, directly or indirectly, with one another (e.g., via one or more buses).

The metadata access manager 920 may support data management in accordance with examples disclosed herein. The request receiving component 925 may be configured as or otherwise support a means for receiving a request to access a subset of metadata stored in a distributed metadata repository of a DMS, where the request has a first semantic format compatible with a first version of the distributed metadata repository. The semantic translating component 930 may be configured as or otherwise support a means for translating the first semantic format of the request to a second semantic format compatible with a second version of the distributed metadata repository, where the first semantic format of the request is translated according to a label in the request. The version determining component 935 may be configured as or otherwise support a means for determining whether a current version of the requested metadata corresponds to the first version of the distributed metadata repository or the second version of the distributed metadata repository. The metadata accessing component 940 may be configured as or otherwise support a means for accessing the requested metadata in the distributed metadata repository based on the current version of the requested metadata.

In some examples, to support determining the current version of the requested metadata, the version determining component 935 may be configured as or otherwise support a means for determining that the current version of the requested metadata corresponds to the first version of the distributed metadata repository. In some examples, to support determining the current version of the requested metadata, the change applying component 945 may be configured as or otherwise support a means for applying one or more representational changes to the requested metadata prior to executing the request.

In some examples, to support accessing the requested metadata, the metadata accessing component 940 may be configured as or otherwise support a means for executing the request without applying representational changes to the requested metadata in response to determining that the current version of the requested metadata corresponds to the second version of the distributed metadata repository.

In some examples, to support determining the current version of the requested metadata, the version determining component 935 may be configured as or otherwise support a means for identifying a table in the distributed metadata repository that includes the requested metadata based on the label in the request.

In some examples, to support determining the current version of the requested metadata, the version determining component 935 may be configured as or otherwise support a means for determining that the table has been upgraded from the first version of the distributed metadata repository to the second version of the distributed metadata repository.

In some examples, to support receiving the request, the request receiving component 925 may be configured as or otherwise support a means for receiving the request prior to upgrading a first set of tables in the distributed metadata repository and subsequent to upgrading a second set of tables in the distributed metadata repository.

In some examples, the metadata upgrading component 950 may be configured as or otherwise support a means for upgrading all metadata in the distributed metadata repository prior to upgrading one or more applications or services that utilize the metadata in the distributed metadata repository.

In some examples, the request receiving component 925 may be configured as or otherwise support a means for receiving a second request to access the requested metadata after upgrading the distributed metadata repository to the second version. In some examples, the metadata accessing component 940 may be configured as or otherwise support a means for executing the second request without translating the second request or applying representational changes to the requested metadata if a semantic format of the second request is compatible with the second version of the distributed metadata repository.

In some examples, to support accessing the requested metadata, the metadata accessing component 940 may be configured as or otherwise support a means for accessing a first table of the distributed metadata repository while a second table of the distributed metadata repository is upgraded, where the first table includes the requested metadata.

In some examples, the version determining component 935 may be configured as or otherwise support a means for determining an access type of the request based on the label in the request, where the access type of the request includes a select operation, an update operation, a read operation, a write operation, or a combination thereof.

In some examples, the data retrieving component 955 may be configured as or otherwise support a means for retrieving multiple data blocks from two or more storage nodes of the DMS. In some examples, the file generating component 960 may be configured as or otherwise support a means for combining the multiple data blocks into a logical file based on the requested metadata.

In some examples, to support accessing the requested metadata, the metadata accessing component 940 may be configured as or otherwise support a means for retrieving the requested metadata from the distributed metadata repository. In some examples, to support accessing the requested metadata, the metadata accessing component 940 may be configured as or otherwise support a means for transmitting an indication of the requested metadata to an application or service associated with the request.

In some examples, to support receiving the request, the request receiving component 925 may be configured as or otherwise support a means for receiving a request to read or write to one or more rows or columns of a table stored in the distributed metadata repository, where the one or more rows or columns include the requested metadata.

In some examples, to support accessing the requested metadata, the metadata accessing component 940 may be configured as or otherwise support a means for returning one or more CQL rows to an application or service in response to the request, where the one or more CQL rows are compatible with an ORM of the application or service.

In some examples, to support accessing the requested metadata, the metadata accessing component 940 may be configured as or otherwise support a means for accessing one or more rows of the distributed metadata repository by invoking an LSP API that is configured to access the distributed metadata repository.

In some examples, the change identifying component 965 may be configured as or otherwise support a means for identifying a first set of metadata changes to be applied to the requested metadata prior to accessing the distributed metadata repository. In some examples, the change identifying component 965 may be configured as or otherwise support a means for identifying a second set of metadata changes that depend on the first set of metadata changes. In some examples, the change applying component 945 may be configured as or otherwise support a means for executing the first set of metadata changes before executing the second set of metadata changes.

In some examples, the graph generating component 970 may be configured as or otherwise support a means for generating a dependency graph that indicates one or more rows, columns, or tables impacted by the first set of metadata changes, where identifying the second set of metadata changes is based on the dependency graph.

In some examples, the change identifying component 965 may be configured as or otherwise support a means for identifying a first set of metadata changes to be applied to the requested metadata prior to executing the request. In some examples, the change identifying component 965 may be configured as or otherwise support a means for identifying a second set of metadata changes that are independent of the first set of metadata changes.

In some examples, the change applying component 945 may be configured as or otherwise support a means for executing the first set of metadata changes in parallel with the second set of metadata changes. In some examples, the request is translated by an LH component of an intermediate protocol proxy that interfaces with the distributed metadata repository.

Figure 10:
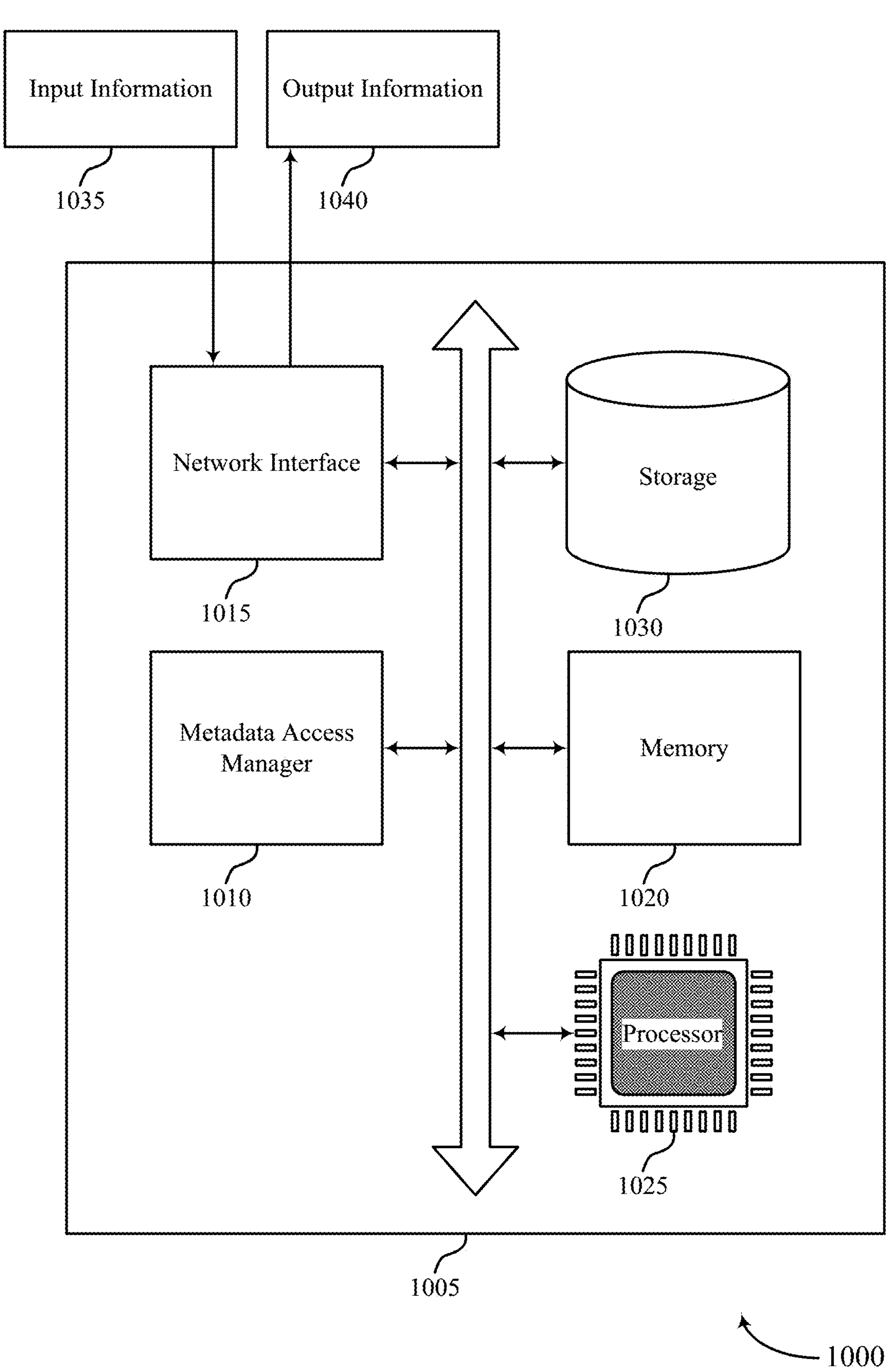
FIG. 10 shows a diagram of a system including a device that supports techniques for upgrading and accessing metadata in accordance with aspects of the present disclosure.

FIG. 10 shows a block diagram 1000 of a system 1005 that supports techniques for upgrading and accessing metadata in accordance with aspects of the present disclosure. The system 1005 may be an example of or include aspects of a system 805, as described herein. The system 1005 may include components for data management, including components such as a metadata access manager 1010, a network interface 1015, memory 1020, processor 1025, and storage 1030. These components may be in electronic communication or otherwise coupled with each other (e.g., operatively, communicatively, functionally, electronically, electrically; via one or more buses, communications links, communications interfaces, or any combination thereof). Additionally, the components of the system 1005 may comprise corresponding physical components or may be implemented as corresponding virtual components (e.g., components of one or more virtual machines). In some examples, the system 1005 may be an example of aspects of one or more components described with reference to FIG. 1, such as a DMS 110.

The network interface 1015 may enable the system 1005 to exchange information (e.g., input information 1035, output information 1040, or both) with other systems or devices (not shown). For example, the network interface 1015 may enable the system 1005 to connect to a network (e.g., a network 120 as described herein). The network interface 1015 may include one or more wireless network interfaces, one or more wired network interfaces, or any combination thereof. In some examples, the network interface 1015 may be an example of may be an example of aspects of one or more components described with reference to FIG. 1, such as one or more network interfaces 165.

Memory 1020 may include RAM, ROM, or both. The memory 1020 may store computer-readable, computer-executable software including instructions that, when executed, cause the processor 1025 to perform various functions described herein. In some cases, the memory 1020 may contain, among other things, a basic input/output system (BIOS), which may control basic hardware or software operation such as the interaction with peripheral components or devices. In some cases, the memory 1020 may be an example of aspects of one or more components described with reference to FIG. 1, such as one or more memories 175.

The processor 1025 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 1025 may be configured to execute computer-readable instructions stored in a memory 1020 to perform various functions (e.g., functions or tasks supporting techniques for upgrading and accessing metadata). Though a single processor 1025 is depicted in the example of FIG. 10, it is to be understood that the system 1005 may include any quantity of one or more of processors 1025 and that a group of processors 1025 may collectively perform one or more functions ascribed herein to a processor, such as the processor 1025. In some cases, the processor 1025 may be an example of aspects of one or more components described with reference to FIG. 1, such as one or more processors 170.

Storage 1030 may be configured to store data that is generated, processed, stored, or otherwise used by the system 1005. In some cases, the storage 1030 may include one or more HDDs, one or more SDDs, or both. In some examples, the storage 1030 may be an example of a single database, a distributed database, multiple distributed databases, a data store, a data lake, or an emergency backup database. In some examples, the storage 1030 may be an example of one or more components described with reference to FIG. 1, such as one or more network disks 180.

The metadata access manager 1010 may support data management in accordance with examples disclosed herein. For example, the metadata access manager 1010 may be configured as or otherwise support a means for receiving a request to access a subset of metadata stored in a distributed metadata repository of a DMS, where the request has a first semantic format compatible with a first version of the distributed metadata repository. The metadata access manager 1010 may be configured as or otherwise support a means for translating the first semantic format of the request to a second semantic format compatible with a second version of the distributed metadata repository, where the first semantic format of the request is translated according to a label in the request. The metadata access manager 1010 may be configured as or otherwise support a means for determining whether a current version of the requested metadata corresponds to the first version of the distributed metadata repository or the second version of the distributed metadata repository. The metadata access manager 1010 may be configured as or otherwise support a means for accessing the requested metadata in the distributed metadata repository based on the current version of the requested metadata.

By including or configuring the metadata access manager 1010 in accordance with examples as described herein, the system 1005 may support techniques for implementing metadata upgrades with fewer disruptions, greater efficiency, and higher failure tolerance, among other benefits. For example, rather than blocking applications and services from accessing metadata while the metadata is being upgraded, the system 1005 (a DMS) may use the techniques described herein to provide uninterrupted metadata access for all metadata upgrade states and operating versions. Specifically, the system 1005 may use an intermediate protocol proxy to ensure that the format and structure of metadata requested by an application or service aligns with the format and structure of metadata returned to the application or service. As such, the described techniques may enable the system 1005 to implement metadata upgrades without delays or compatibility issues.

Figure 11:
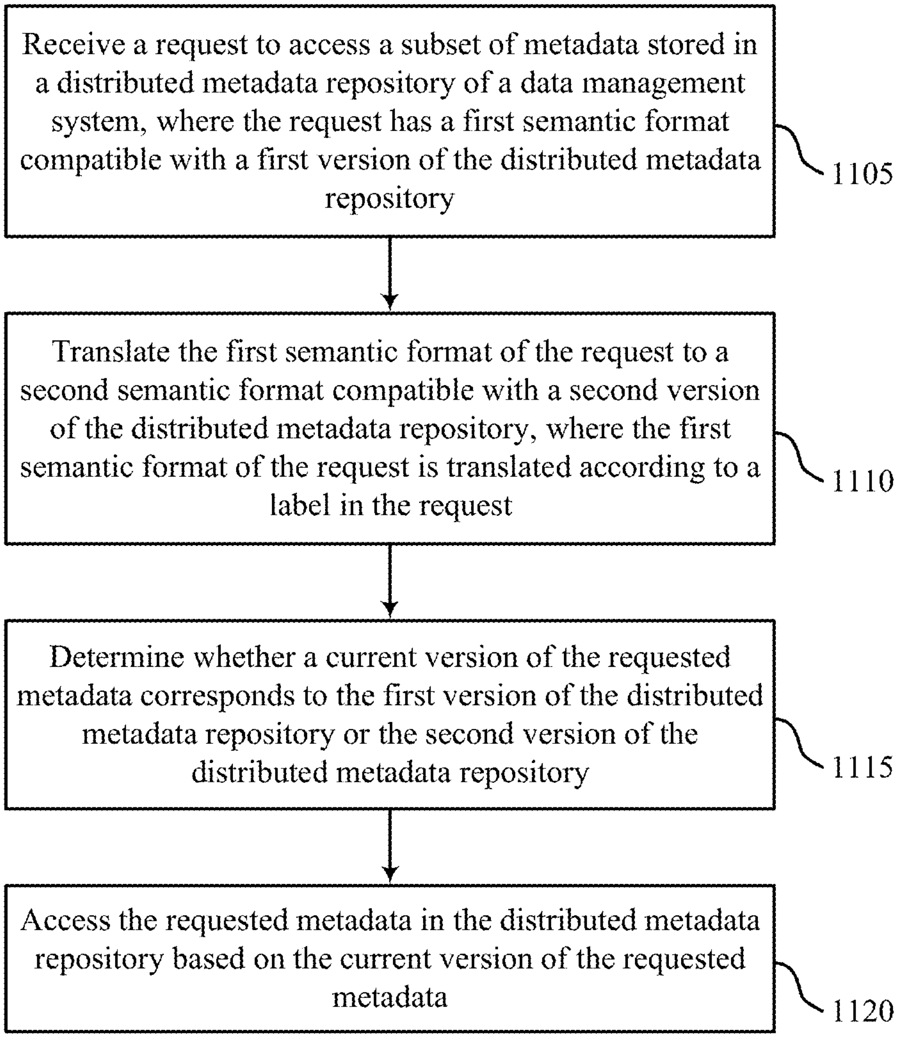
FIGS. 11 and 12 show flowcharts illustrating methods that support techniques for upgrading and accessing metadata in accordance with aspects of the present disclosure.

FIG. 11 shows a flowchart illustrating a method 1100 that supports techniques for upgrading and accessing metadata in accordance with aspects of the present disclosure. The operations of the method 1100 may be implemented by a DMS or components thereof. For example, the operations of the method 1100 may be performed by a DMS 110, as described with reference to FIG. 1. In some examples, a DMS may execute a set of instructions to control the functional elements of the DMS to perform the described functions. Additionally, or alternatively, the DMS may perform aspects of the described functions using special-purpose hardware.

At 1105, the DMS may receive a request to access a subset of metadata stored in a distributed metadata repository of the DMS, where the request has a first semantic format compatible with a first version of the distributed metadata repository. The operations of 1105 may be performed in accordance with examples disclosed herein. In some examples, aspects of the operations of 1105 may be performed by a request receiving component 925, as described with reference to FIG. 9.

At 1110, the DMS may translate the first semantic format of the request to a second semantic format compatible with a second version of the distributed metadata repository, where the first semantic format of the request is translated according to a label in the request. The operations of 1110 may be performed in accordance with examples disclosed herein. In some examples, aspects of the operations of 1110 may be performed by a semantic translating component 930, as described with reference to FIG. 9.

At 1115, the DMS may determine whether a current version of the requested metadata corresponds to the first version of the distributed metadata repository or the second version of the distributed metadata repository. The operations of 1115 may be performed in accordance with examples disclosed herein. In some examples, aspects of the operations of 1115 may be performed by a version determining component 935, as described with reference to FIG. 9.

At 1120, the method may include accessing the requested metadata in the distributed metadata repository based on the current version of the requested metadata. The operations of 1120 may be performed in accordance with examples disclosed herein. In some examples, aspects of the operations of 1120 may be performed by a metadata accessing component 940, as described with reference to FIG. 9.

Figure 12:
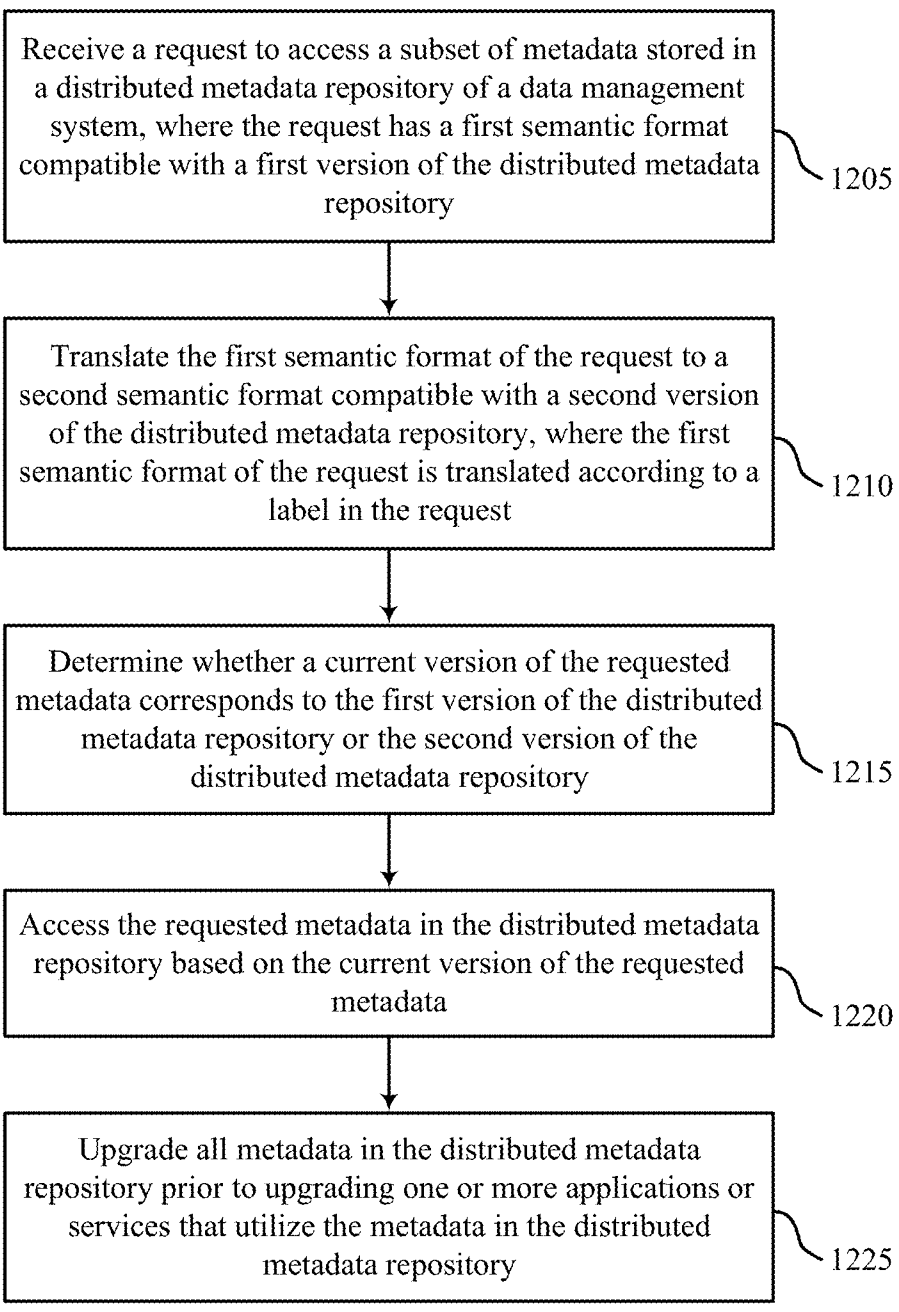

FIG. 12 shows a flowchart illustrating a method 1200 that supports techniques for upgrading and accessing metadata in accordance with aspects of the present disclosure. The operations of the method 1200 may be implemented by a DMS or components thereof. For example, the operations of the method 1200 may be performed by a DMS 110, as described with reference to FIG. 1. In some examples, a DMS may execute a set of instructions to control the functional elements of the DMS to perform the described functions. Additionally, or alternatively, the DMS may perform aspects of the described functions using special-purpose hardware.

At 1205, the DMS may receive a request to access a subset of metadata stored in a distributed metadata repository of a DMS, where the request has a first semantic format compatible with a first version of the distributed metadata repository. The operations of 1205 may be performed in accordance with examples disclosed herein. In some examples, aspects of the operations of 1205 may be performed by a request receiving component 925, as described with reference to FIG. 9.

At 1210, the DMS may translate the first semantic format of the request to a second semantic format compatible with a second version of the distributed metadata repository, where the first semantic format of the request is translated according to a label in the request. The operations of 1210 may be performed in accordance with examples disclosed herein. In some examples, aspects of the operations of 1210 may be performed by a semantic translating component 930, as described with reference to FIG. 9.

At 1215, the DMS may determine whether a current version of the requested metadata corresponds to the first version of the distributed metadata repository or the second version of the distributed metadata repository. The operations of 1215 may be performed in accordance with examples disclosed herein. In some examples, aspects of the operations of 1215 may be performed by a version determining component 935, as described with reference to FIG. 9.

At 1220, the DMS may access the requested metadata in the distributed metadata repository based on the current version of the requested metadata. The operations of 1220 may be performed in accordance with examples disclosed herein. In some examples, aspects of the operations of 1220 may be performed by a metadata accessing component 940, as described with reference to FIG. 9.

At 1225, the DMS may upgrade all metadata in the distributed metadata repository prior to upgrading one or more applications or services that utilize the metadata in the distributed metadata repository. The operations of 1225 may be performed in accordance with examples disclosed herein. In some examples, aspects of the operations of 1225 may be performed by a metadata upgrading component 950, as described with reference to FIG. 9.

A method for data management is described. The method may include receiving a request to access a subset of metadata stored in a distributed metadata repository of a DMS, where the request has a first semantic format compatible with a first version of the distributed metadata repository. The method may further include translating the first semantic format of the request to a second semantic format compatible with a second version of the distributed metadata repository, where the first semantic format of the request is translated according to a label in the request. The method may further include determining whether a current version of the requested metadata corresponds to the first version of the distributed metadata repository or the second version of the distributed metadata repository. The method may further include accessing the requested metadata in the distributed metadata repository based on the current version of the requested metadata.

An apparatus for data management is described. The apparatus may include a processor, memory coupled with the processor, and instructions stored in the memory. The instructions may be executable by the processor to cause the apparatus to receive a request to access a subset of metadata stored in a distributed metadata repository of a DMS, where the request has a first semantic format compatible with a first version of the distributed metadata repository. The instructions may be further executable by the processor to cause the apparatus to translate the first semantic format of the request to a second semantic format compatible with a second version of the distributed metadata repository, where the first semantic format of the request is translated according to a label in the request. The instructions may be further executable by the processor to cause the apparatus to determine whether a current version of the requested metadata corresponds to the first version of the distributed metadata repository or the second version of the distributed metadata repository. The instructions may be further executable by the processor to cause the apparatus to access the requested metadata in the distributed metadata repository based on the current version of the requested metadata.

Another apparatus for data management is described. The apparatus may include means for receiving a request to access a subset of metadata stored in a distributed metadata repository of a DMS, where the request has a first semantic format compatible with a first version of the distributed metadata repository. The apparatus may further include means for translating the first semantic format of the request to a second semantic format compatible with a second version of the distributed metadata repository, where the first semantic format of the request is translated according to a label in the request. The apparatus may further include means for determining whether a current version of the requested metadata corresponds to the first version of the distributed metadata repository or the second version of the distributed metadata repository. The apparatus may further include means for accessing the requested metadata in the distributed metadata repository based on the current version of the requested metadata.

A non-transitory computer-readable medium storing code for data management is described. The code may include instructions executable by a processor to receive a request to access a subset of metadata stored in a distributed metadata repository of a DMS, where the request has a first semantic format compatible with a first version of the distributed metadata repository. The instructions may be further executable by the processor to translate the first semantic format of the request to a second semantic format compatible with a second version of the distributed metadata repository, where the first semantic format of the request is translated according to a label in the request. The instructions may be further executable by the processor to determine whether a current version of the requested metadata corresponds to the first version of the distributed metadata repository or the second version of the distributed metadata repository. The instructions may be further executable by the processor to access the requested metadata in the distributed metadata repository based on the current version of the requested metadata.

In some examples of the methods, apparatuses, and non-transitory computer-readable media described herein, determining the current version of the requested metadata may include operations, features, means, or instructions for determining that the current version of the requested metadata corresponds to the first version of the distributed metadata repository and operations, features, means, or instructions for applying one or more representational changes to the requested metadata prior to executing the request.

In some examples of the methods, apparatuses, and non-transitory computer-readable media described herein, accessing the requested metadata may include operations, features, means, or instructions for executing the request without applying representational changes to the requested metadata in response to determining that the current version of the requested metadata corresponds to the second version of the distributed metadata repository.

In some examples of the methods, apparatuses, and non-transitory computer-readable media described herein, determining the current version of the requested metadata may include operations, features, means, or instructions for identifying a table in the distributed metadata repository that includes the requested metadata based on the label in the request and determining that the table has been upgraded from the first version of the distributed metadata repository to the second version of the distributed metadata repository.

In some examples of the methods, apparatuses, and non-transitory computer-readable media described herein, receiving the request may include operations, features, means, or instructions for receiving the request prior to upgrading a first set of tables in the distributed metadata repository and subsequent to upgrading a second set of tables in the distributed metadata repository.

Some examples of the methods, apparatuses, and non-transitory computer-readable media described herein may further include operations, features, means, or instructions for upgrading all metadata in the distributed metadata repository prior to upgrading one or more applications or services that utilize the metadata in the distributed metadata repository.

Some examples of the methods, apparatuses, and non-transitory computer-readable media described herein may further include operations, features, means, or instructions for receiving a second request to access the requested metadata after upgrading the distributed metadata repository to the second version and operations, features, means, or instructions for executing the second request without translating the second request or applying representational changes to the requested metadata if a semantic format of the second request is compatible with the second version of the distributed metadata repository.

In some examples of the methods, apparatuses, and non-transitory computer-readable media described herein, accessing the requested metadata may include operations, features, means, or instructions for accessing a first table of the distributed metadata repository while a second table of the distributed metadata repository is upgraded, where the first table includes the requested metadata.

Some examples of the methods, apparatuses, and non-transitory computer-readable media described herein may further include operations, features, means, or instructions for determining an access type of the request based on the label in the request, where the access type of the request includes a select operation, an update operation, a read operation, a write operation, or a combination thereof.

Some examples of the methods, apparatuses, and non-transitory computer-readable media described herein may further include operations, features, means, or instructions for retrieving multiple data blocks from two or more storage nodes of the DMS and combining the multiple data blocks into a logical file based on the requested metadata.

In some examples of the methods, apparatuses, and non-transitory computer-readable media described herein, accessing the requested metadata may include operations, features, means, or instructions for retrieving the requested metadata from the distributed metadata repository and transmitting an indication of the requested metadata to an application or service associated with the request.

In some examples of the methods, apparatuses, and non-transitory computer-readable media described herein, receiving the request may include operations, features, means, or instructions for receiving a request to read or write to one or more rows or columns of a table stored in the distributed metadata repository, where the one or more rows or columns include the requested metadata.

In some examples of the methods, apparatuses, and non-transitory computer-readable media described herein, accessing the requested metadata may include operations, features, means, or instructions for returning one or more CQL rows to an application or service in response to the request, where the one or more CQL rows are compatible with an ORM of the application or service.

In some examples of the methods, apparatuses, and non-transitory computer-readable media described herein, accessing the requested metadata may include operations, features, means, or instructions for accessing one or more rows of the distributed metadata repository by invoking an LSP API that is configured to access the distributed metadata repository.

Some examples of the methods, apparatuses, and non-transitory computer-readable media described herein may further include operations, features, means, or instructions for identifying a first set of metadata changes to be applied to the requested metadata prior to accessing the distributed metadata repository, identifying a second set of metadata changes that depend on the first set of metadata changes, and executing the first set of metadata changes before executing the second set of metadata changes.

Some examples of the methods, apparatuses, and non-transitory computer-readable media described herein may further include operations, features, means, or instructions for generating a dependency graph that indicates one or more rows, columns, or tables impacted by the first set of metadata changes, where identifying the second set of metadata changes is based on the dependency graph.

Some examples of the methods, apparatuses, and non-transitory computer-readable media described herein may further include operations, features, means, or instructions for identifying a first set of metadata changes to be applied to the requested metadata prior to executing the request, identifying a second set of metadata changes that are independent of the first set of metadata changes, and executing the first set of metadata changes in parallel with the second set of metadata changes.

In some examples of the methods, apparatuses, and non-transitory computer-readable media described herein, the request may be translated by an LH component of an intermediate protocol proxy that interfaces with the distributed metadata repository.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data management, comprising:

receiving a request to access a subset of metadata stored in a distributed metadata repository of a data management system, wherein the request has a first semantic format compatible with a first version of the distributed metadata repository, and wherein the request is received during a rolling upgrade of the distributed metadata repository;

routing the request based at least in part on a label in the request;

translating the first semantic format of the request to a second semantic format compatible with a second version of the distributed metadata repository, wherein the first semantic format of the request is translated according to the label in the request;

identifying a first set of metadata changes to be applied to the request;

applying the first set of metadata changes to the request based at least in part on a current version of the subset of metadata and further based at least in part on the label; and accessing the subset of metadata in the distributed metadata repository based at least in part on the current version of the subset of metadata.

2. The method of claim 1, wherein the request is translated by a label handling component of an intermediate protocol proxy that interfaces with the distributed metadata repository.

3. The method of claim 1, wherein an access type of the request is based at least in part on the label, the access type of the request comprising a select operation, an update operation, a read operation, a write operation, or a combination thereof.

4. The method of claim 1, further comprising:

applying, during the rolling upgrade, one or more upgrades to the distributed metadata repository associated with the second version of the distributed metadata repository, wherein the request is received while the distributed metadata repository is in a partially upgraded state.

5. The method of claim 4, further comprising:

refraining from applying a second set of metadata changes to the request based at least in part on applying the one or more upgrades to the distributed metadata repository.

6. The method of claim 1, wherein the first set of metadata changes are based at least in part on a current version of a branch of the data management system associated with the subset of metadata.

7. The method of claim 1, further comprising:

upgrading all metadata in the distributed metadata repository prior to upgrading one or more applications or services that utilize the metadata in the distributed metadata repository.

8. The method of claim 1, further comprising:

receiving a second request to access the subset of metadata after upgrading the distributed metadata repository to the second version; and executing the second request without translating the second request or applying representational changes to the subset of metadata if a semantic format of the second request is compatible with the second version of the distributed metadata repository.

9. The method of claim 1, wherein accessing the subset of metadata comprises:

accessing a first table of the distributed metadata repository while a second table of the distributed metadata repository is upgraded, wherein the first table includes the subset of metadata.

10. The method of claim 1, wherein accessing the subset of metadata comprises:

retrieving the subset of metadata from the distributed metadata repository; and transmitting an indication of the subset of metadata to an application or service associated with the request.

11. The method of claim 1, wherein receiving the request comprises:

receiving a request to read or write to one or more rows or columns of a table stored in the distributed metadata repository, wherein the one or more rows or columns comprise the subset of metadata.

12. The method of claim 1, further comprising:

identifying a second set of metadata changes that depend on the first set of metadata changes; and applying the second set of metadata changes after applying the first set of metadata changes.

13. The method of claim 12, further comprising:

generating a dependency graph that indicates one or more rows, columns, or tables impacted by the first set of metadata changes, wherein identifying the second set of metadata changes is based at least in part on the dependency graph.

14. The method of claim 1, further comprising:

identifying a second set of metadata changes that are independent of the first set of metadata changes; and applying the second set of metadata changes in parallel with the first set of metadata changes.

15. An apparatus for data management, comprising:

at least one processor;

memory coupled with the at least one processor; and instructions stored in the memory and executable by the at least one processor to cause the apparatus to:

receive a request to access a subset of metadata stored in a distributed metadata repository of a data management system, wherein the request has a first semantic format compatible with a first version of the distributed metadata repository, and wherein the request is received during a rolling upgrade of the distributed metadata repository;

route the request based at least in part on a label in the request;

translate the first semantic format of the request to a second semantic format compatible with a second version of the distributed metadata repository, wherein the first semantic format of the request is translated according to the label in the request;

identify a first set of metadata changes to be applied to the request;

apply the first set of metadata changes to the request based at least in part on a current version of the subset of metadata and further based at least in part on the label; and access the subset of metadata in the distributed metadata repository based at least in part on the current version of the subset of metadata.

16. The apparatus of claim 15, wherein the instructions are executable by the at least one processor to cause the apparatus to:

apply, during the rolling upgrade, one or more upgrades to the distributed metadata repository associated with the second version of the distributed metadata repository, wherein the request is received while the distributed metadata repository is in a partially upgraded state.

17. The apparatus of claim 16, wherein the instructions are executable by the at least one processor to cause the apparatus to:

refrain from applying a second set of metadata changes to the request based at least in part on applying the one or more upgrades to the distributed metadata repository.

18. A non-transitory computer-readable medium storing code for data management, the code comprising instructions executable by at least one processor to:

receive a request to access a subset of metadata stored in a distributed metadata repository of a data management system, wherein the request has a first semantic format compatible with a first version of the distributed metadata repository, and wherein the request is received during a rolling upgrade of the distributed metadata repository;

route the request based at least in part on a label in the request;

translate the first semantic format of the request to a second semantic format compatible with a second version of the distributed metadata repository, wherein the first semantic format of the request is translated according to the label in the request;

identify a first set of metadata changes to be applied to the request;

apply the first set of metadata changes to the request based at least in part on a current version of the subset of metadata and further based at least in part on the label; and access the subset of metadata in the distributed metadata repository based at least in part on the current version of the subset of metadata.

* * * * *